United States Patent
Fini et al.

(10) Patent No.: US 8,903,211 B2
(45) Date of Patent: Dec. 2, 2014

(54) PUMP-COMBINING SYSTEMS AND TECHNIQUES FOR MULTICORE FIBER TRANSMISSIONS

(71) Applicant: OFS Fitel, LLC, Norcross, GA (US)

(72) Inventors: John M Fini, Metuchen, NJ (US); Thierry F Taunay, Bridgewater, NJ (US); Man F Yan, Berkeley Heights, NJ (US); Benyuan Zhu, Princeton, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 13/953,352

(22) Filed: Jul. 29, 2013

(65) Prior Publication Data

US 2014/0036351 A1     Feb. 6, 2014

Related U.S. Application Data

(63) Continuation-in-part of application No. 13/049,320, filed on Mar. 16, 2011, now Pat. No. 8,693,088.

(51) Int. Cl.
| | |
|---|---|
| *G02B 6/26* | (2006.01) |
| *H01S 3/094* | (2006.01) |
| *G02B 6/28* | (2006.01) |
| *G02B 6/02* | (2006.01) |
| *H01S 3/067* | (2006.01) |
| *G02B 6/255* | (2006.01) |

(52) U.S. Cl.
CPC .............. *G02B 6/262* (2013.01); *G02B 6/2856* (2013.01); *H01S 3/06754* (2013.01); *H01S 3/094019* (2013.01); *G02B 6/02042* (2013.01); *G02B 6/2835* (2013.01); *H01S 3/094057* (2013.01); *G02B 6/2552* (2013.01)

USPC .......... 385/50; 385/43; 385/126; 359/341.32; 359/349

(58) Field of Classification Search
CPC ................ G02B 6/02042; G02B 6/262; H01S 3/094057
See application file for complete search history.

(56) References Cited

U.S. PATENT DOCUMENTS

| | | | | |
|---|---|---|---|---|
| 4,315,666 | A | * | 2/1982 | Hicks, Jr. .......................... 385/30 |
| 4,546,476 | A | * | 10/1985 | Shaw et al. ......................... 372/6 |
| 4,603,421 | A | * | 7/1986 | Scifres et al. ............... 372/50.12 |
| 4,773,924 | A | * | 9/1988 | Berkey ............................ 65/409 |

(Continued)

FOREIGN PATENT DOCUMENTS

| | | | | |
|---|---|---|---|---|
| EP | 609765 A2 | * | 8/1994 | ............... G02B 6/28 |
| JP | 60031105 A | * | 2/1985 | ............... G02B 6/36 |

(Continued)

*Primary Examiner* — Ari M Diacou
(74) *Attorney, Agent, or Firm* — Daniel Kim, Esq.

(57) ABSTRACT

An optical fiber coupler connects transmission multicore optical fiber (TMCF) with an amplifier multicore optical fiber (AMCF) and a plurality of optical pump fibers. The coupler includes a plurality of signal cores extending between a multicore input endface and a coupler output endface, and a plurality of pump cores extending between a pump input and the coupler output endface. The multicore input endface is connectable to the TMCF, and the pump input is connectable to the optical pump fibers. Each pump core is paired with a corresponding signal core to form a core pair that is adiabatically tapered such that signal light carried by the signal core is combined with pump light carried by the pump core. The coupler output endface is connectable to the AMCF such that the combined light output of each core pair is provided as an input to a respective AMCF core.

27 Claims, 19 Drawing Sheets

(56) References Cited

U.S. PATENT DOCUMENTS

| | | | |
|---|---|---|---|
| 4,778,238 A * | 10/1988 | Hicks | 398/92 |
| 4,799,949 A * | 1/1989 | Keck et al. | 65/409 |
| 4,886,333 A * | 12/1989 | Hicks | 385/12 |
| 4,948,217 A * | 8/1990 | Keck et al. | 385/24 |
| 5,058,980 A * | 10/1991 | Howerton | 385/31 |
| 5,136,420 A * | 8/1992 | Inagaki et al. | 359/341.3 |
| 5,379,357 A * | 1/1995 | Sentsui et al. | 385/11 |
| 5,448,661 A * | 9/1995 | Takai et al. | 385/24 |
| 5,548,672 A * | 8/1996 | Hattori et al. | 385/43 |
| 5,566,196 A * | 10/1996 | Scifres | 372/6 |
| 5,742,722 A * | 4/1998 | Imoto | 385/126 |
| 5,933,271 A * | 8/1999 | Waarts et al. | 359/341.31 |
| 6,477,295 B1 * | 11/2002 | Lang et al. | 385/31 |
| 6,480,659 B1 * | 11/2002 | Patlakh et al. | 385/125 |
| 6,539,155 B1 * | 3/2003 | Broeng et al. | 385/125 |
| 6,611,648 B2 * | 8/2003 | Kumar et al. | 385/126 |
| 6,628,876 B1 * | 9/2003 | Shmulovich | 385/129 |
| 6,975,898 B2 * | 12/2005 | Seibel | 600/473 |
| 7,016,573 B2 * | 3/2006 | Dong et al. | 385/46 |
| 7,034,992 B2 * | 4/2006 | Komine | 359/334 |
| 7,221,822 B2 * | 5/2007 | Grudinin et al. | 385/30 |
| 7,272,956 B1 * | 9/2007 | Anikitchev et al. | 65/409 |
| 7,289,707 B1 * | 10/2007 | Chavez-Pirson et al. | 385/116 |
| 7,327,920 B2 * | 2/2008 | Dong et al. | 385/115 |
| 7,409,128 B2 * | 8/2008 | Holcomb et al. | 385/115 |
| 7,492,993 B2 * | 2/2009 | Nakai et al. | 385/46 |
| 7,813,603 B2 * | 10/2010 | Nikolajsen | 385/39 |
| 7,845,860 B2 * | 12/2010 | Fiorentino et al. | 385/89 |
| 8,085,464 B2 * | 12/2011 | Gonthier et al. | 359/341.3 |
| 8,488,235 B2 * | 7/2013 | Rothenberg | 359/349 |
| 2002/0105715 A1 * | 8/2002 | Naito et al. | 359/334 |
| 2002/0146226 A1 * | 10/2002 | Davis et al. | 385/126 |
| 2002/0176677 A1 * | 11/2002 | Kumar et al. | 385/126 |
| 2003/0048524 A1 * | 3/2003 | Chavez-Pirson et al. | 359/333 |
| 2005/0078714 A1 * | 4/2005 | Komine | 372/3 |
| 2006/0010920 A1 * | 1/2006 | Cheo | 65/390 |
| 2007/0003196 A1 * | 1/2007 | Holcomb et al. | 385/115 |
| 2009/0201575 A1 * | 8/2009 | Fermann et al. | 359/341.32 |
| 2009/0201953 A1 * | 8/2009 | Peyghambarian et al. | 372/6 |
| 2010/0278486 A1 * | 11/2010 | Holland et al. | 385/43 |
| 2011/0032603 A1 * | 2/2011 | Rothenberg | 359/341.1 |
| 2011/0032604 A1 * | 2/2011 | Rothenberg et al. | 359/341.4 |
| 2011/0129231 A1 * | 6/2011 | Fiorentino et al. | 398/141 |
| 2011/0141555 A1 * | 6/2011 | Fermann et al. | 359/341.3 |
| 2011/0235165 A1 * | 9/2011 | Sugimoto et al. | 359/341.3 |
| 2011/0280517 A1 * | 11/2011 | Fini et al. | 385/43 |
| 2012/0087626 A1 * | 4/2012 | Nagashima et al. | 385/124 |
| 2012/0183304 A1 * | 7/2012 | Winzer et al. | 398/142 |
| 2013/0063809 A1 * | 3/2013 | Nishihara et al. | 359/341.2 |
| 2013/0216184 A1 * | 8/2013 | Kopp et al. | 385/43 |
| 2013/0301991 A1 * | 11/2013 | Kopp et al. | 385/43 |
| 2014/0119694 A1 * | 5/2014 | Abedin et al. | 385/43 |

FOREIGN PATENT DOCUMENTS

| | | | | |
|---|---|---|---|---|
| JP | 60120585 A | * | 6/1985 | H01S 3/30 |
| JP | 06018744 A | * | 1/1994 | G02B 6/28 |
| JP | 09230156 A | * | 9/1997 | G02B 6/16 |
| JP | 10125988 A | * | 5/1998 | H01S 3/10 |

* cited by examiner

PUMP-COMBINING SYSTEMS AND TECHNIQUES FOR MULTICORE FIBER TRANSMISSIONS

CROSS REFERENCE TO RELATED APPLICATIONS

The present application is a continuation-in-part of U.S. patent application Ser. No. 13/049,320, filed on Mar. 16, 2011, which is owned by the assignee of the present application, and which is incorporated herein by reference in its entirety.

U.S. patent application Ser. No. 13/049,320 claims the priority benefit of U.S. Provisional Patent Application Ser. No. 61/314,181, filed on Mar. 16, 2010.

BACKGROUND OF THE INVENTION

1. Field of the Invention

The present invention relates generally to field of fiber optics and in particular, to pump-combining systems and techniques for use in multicore fiber transmissions.

2. Background Art

Transmissions over multicore fibers (MCFs) have been successfully demonstrated, and are being proposed for various optical communications systems. The ultimate success of MCF-based transmission systems will depend, in significant part, on the development of network components for use with MCFs.

Fiber amplifiers are important components in typical optical transmission systems. A fiber amplifier comprises a length of optical fiber that has been doped with a rare-earth dopant; such as erbium. Light at a first wavelength (e.g., 980 nm) that is launched into the fiber is absorbed by the rare-earth dopant ions, which then emit light at a second, longer wavelength (e.g., 1550 nm). Thus, launching a combined light into the fiber, comprising both a pump light at the first wavelength and a signal light at the second wavelength, results in amplification of the signal light.

Successful multicore transmission fibers and amplifier fibers have already been developed having six or more cores. There is a continuing effort to develop multicore fibers and devices with improved performance and a greater number of cores.

Coupling is a significant issue in the development of successful multicore fiber amplifiers. In a low-crosstalk amplifier, each, core of a transmission multicore fiber must be connected to a corresponding individual core of an amplifier multicore fiber. In addition, pump light must also be launched into the amplifier multicore fiber.

A successful coupling solution should address both performance and cost. Although coupling solutions have been developed for single-core transmission systems, these structures are not readily adaptable to multicore transmission systems. Current proposals for multicore coupling schemes from a number of drawbacks, including high attenuation, high cost, and complexity. There is thus a need for simple, low-loss coupling structures and techniques suitable for use with multicore transmission fibers, multicore amplifier fibers, and pump light inputs.

SUMMARY OF THE INVENTION

An aspect of the invention provides an optical fiber coupler for connecting a transmission multicore optical fiber (TMCF) with an amplifier multicore optical fiber (AMCF) and a plurality of optical pump fibers. A plurality of signal cores extends between a multicore input endface and a coupler output endface. The multicore input endface is configured to be connectable to the TMCF such that each signal core carries signal light at a signal wavelength from a respective TMCF core. A plurality of pump cores extends between a pump input and the coupler output endface. Each pomp input is configured to be connectable to a pump input fiber such that each pump core carries pump light at a pump wavelength, from a respective pump input fiber.

Each pump core is paired with a corresponding signal core to form a core pair that is adiabatically tapered along an adiabatically tapered coupler section, such that signal light carried by the signal core is combined with pump light carried by the pump core along the adiabatically tapered section. The coupler output endface is configured to be connectable to the AMCF such that the combined light output of each core pair is provided as an input to a respective AMCF core.

Further aspects of the invention are directed to structures and techniques for providing "one-way" coupling between the pump core and the signal core, such that either pump light is coupled out of the pump core into the signal core, or signal light is coupled out of the signal core into the pump core, but not both.

DETAILED DESCRIPTION

Aspects of the present invention are directed to coupling structures and techniques for connecting a transmission multicore fiber (TMCF) with an amplifier multicore fiber (AMCF), wherein signal light from each TMCF core is combined with, pump light and provided as an input to a respective AMCF core.

According to aspects of the invention described herein, this coupling is provided by a pairwise coupler comprising one or more core pairs, each of which includes a signal core and a pump core. Each signal core receives a signal light input from a TMCF core, and each pump core receives a pump light input from a pump light source.

A "one-way" coupling technique according to a further aspect of the invention provides an adiabatically tapered mechanism that couples light at the signal wavelength, but not the pump wavelength. In an alternative configuration, a coupler is designed and fabricated to couple light at the pump wavelength, but not the signal wavelength. In either case, light is coupled in one direction only, causing both pump light and signal light to end up in the same core, where they are combined and provided as an input into a respective AMCF core.

The adiabatic tapered mechanism provides robustness, so that several pairs of signal and pump cores can be combined in a single taper without individual tuning of each pair. The pairwise coupler is designed to achieve highly efficient coupling between the signal and pump cores in each core pair. According to a further aspect of the invention, coupling is sufficiently broadband to accommodate dense wavelength-division multiplexing signals, or the like.

It will be noted that although aspects of the invention are described with respect to multicore transmission and amplifier fibers, the structures and techniques described herein may also be employed with single-core fibers, as well as other fiber types.

Figure 1:
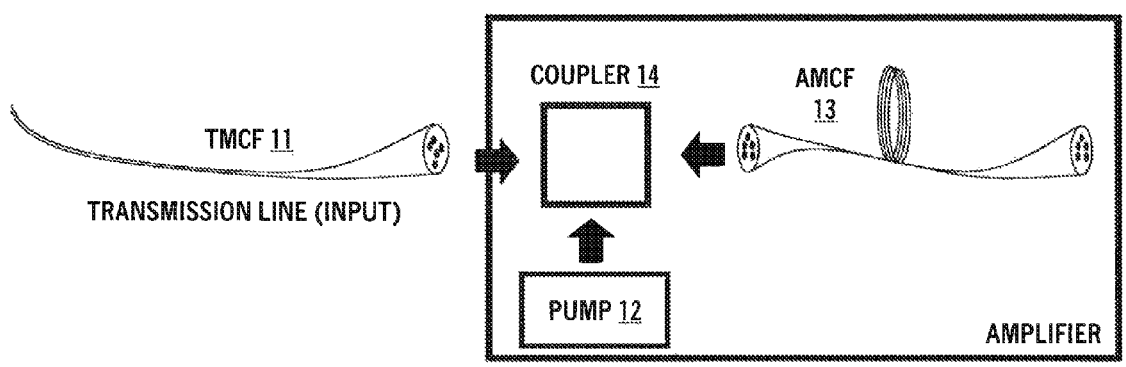
FIG. 1 is a general diagram of a multicore fiber amplification system.

These and other aspects of the invention are described in detail below. The present discussion is organized into the following sections:

1. Overview of Pairwise Coupler Architecture
2. Exemplary Pairwise Couplers
3. Adiabatic Taper
4. One-Way Coupling
4.1 One-Way Coupling from P Core to S Core
4.2 One-Way Coupling from S Core to P Core
5. Cladding Reduction
6. Scalability
7. Single-Core Transmission fibers
8. Exemplary Techniques
1. Overview of Pairwise Coupler Architecture FIG. 1 is a simplified diagram illustrating an exemplary optical fiber amplification system 10. System 10 includes the following components:

a transmission multicore fiber (TMCF) 11, comprising a transmission fiber, such as the transmission line of an optical communication system, that has a plurality of individual cores, each of which, carries a respective signal light at a signal wavelength, e.g., 1550 nm;

a pump light source 12 that provides pump light at a designated pump wavelength, e.g., 980 nm;

an amplifying multicore fiber (AMCF) 13, comprising a rare-earth-doped amplifier fiber having individual cores that use the pump light input to amplify respective light signals carried by each amplifier core; and a coupler 14 that connects together the TMCF, the pump light source, and the AMCF, so that signal light carried by each individual TMCF core is fed into a respective individual AMCF core, and so that pump light is also fed into the AMCF to be available for amplification of the signal light.

Aspects of the present invention are directed to a coupler 14 employing a "pairwise" architecture, comprising a fused body having a plurality of individual signal cores carrying respective signal lights from corresponding TMCF cores are paired with corresponding individual pump cores carrying pump light from a pomp light source. Coupling between the signal core and pump core in a core pair causes the signal light and pump light to be combined. The combined, light from each core pair is then fed into a respective AMCF core.

Figure 2:
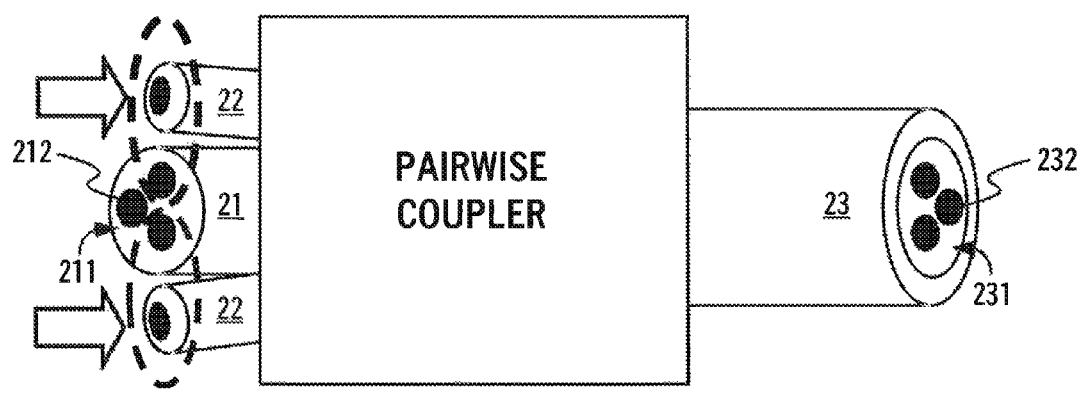
FIG. 2 is a simplified, diagram illustrating the general concept of a pairwise multicore coupler system according to an aspect of the invention.

FIG. 2 is a simplified diagram that generally illustrates the operation of a pairwise coupler 20. Coupler 20 includes a multicore input 21 with an endface 211 that is configured to be connectable to a TMCF such that the multicore input cores 212 are aligned with the cores of the TMCF, thereby allowing the signal light from, each individual TMCF core to be fed, with acceptably low loss, into a corresponding coupler signal core.

Coupler 20 further includes a plurality of pump input pigtail fibers 22 that are configured to be connectable to a pump light source. In the present example, the pump input fibers 22 are configured as single-core, single-mode fibers that are connectable to a like pump light source fiber. As discussed below, however, a coupler according to aspects of the invention may employ other types of pump input fibers, including multicore and multimode fibers.

Coupler 20 further includes a multicore output 23 having an endface 231 that is configured to be connectable to an AMCF. The multicore coupler output cores 232 are arranged so as to line up with the AMCF cores, thereby allowing individual multicore output cores 231 to be connected, with acceptably low loss, to a respective individual AMCF core.

When it is said that a coupler according to the present invention is "connectable" to an AMCF, TMCF, and pump source, it will be understood that the present description includes various means of connection, including coupler structures in which some or all of the components are "automatically" connected to each other. For example, any or all of the pump input fibers, the TMCF, or the AMCF may comprise a portion of the coupler structure. Alternatively, the coupler may be connectable to any of the pump input fibers, TMCF, or AMCF through the use of various techniques and structures, including splicing, lens-coupling, GRIN fiber coupler, and the like. In one preferred practice of the invention, the multicore input and multicore output are configured to provide simple, low-loss connection (e.g., low-loss splicing), by configuring the multicore input and output to have a core arrangement and mode size matching that of the fibers to which the input and output are to be connected.

Coupler 20 is configured to create a paired relationship between individual signal cores and individual pump cores. Signal light and pump light for each individual core pair are provided as a combined output at respective output cores.

Thus, in the depicted architecture, each individual pump light and signal light is combined in pairwise fashion, that is, each pump is combined with light in one signal core of the TMCF, and coupled into one core of the AMCF. Such an arrangement is desirable because it facilitates gain equalization among the several cores in the AMCF.

A pairwise coupler configuration has a number of advantages over other approaches. For example, compared with a typical fan-out configuration, a pairwise configure has fewer components and a lower cost. Compared with a cladding-pumped configuration, a pairwise coupler configuration allows pump light to be matched to each individual signal light to facilitate gain equalization among the cores. Because the pump light is carried by individual cores in the AMCF, rather than by the cladding, the pairwise coupler configuration provides higher pump absorption.

2. Exemplary Pairwise Couplers

Figure 3:
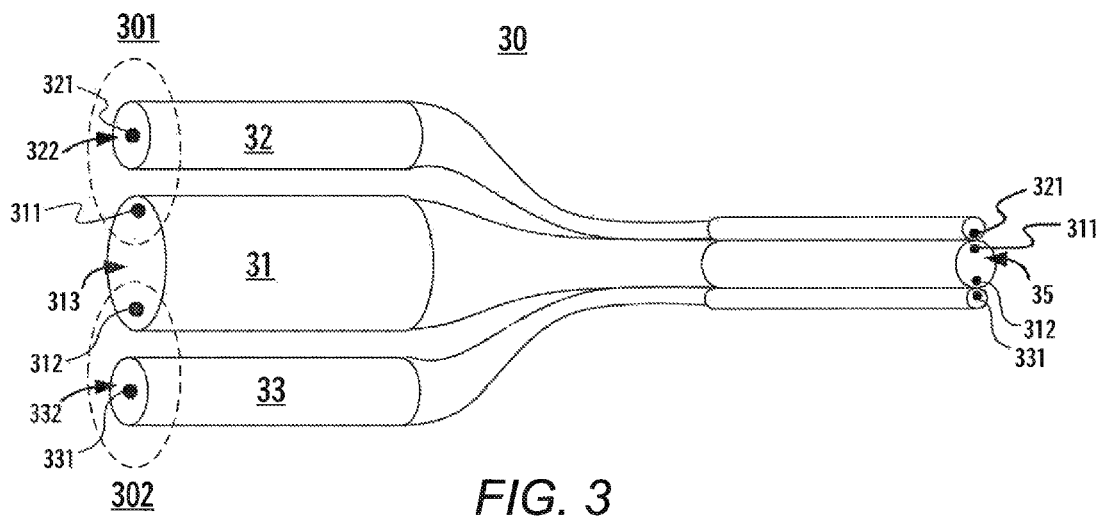
FIG. 3 is diagram of an exemplary pairwise coupler system comprising two signal cores and two pump cores paired to the signal cores.

FIG. 3 is a simplified drawing of an exemplary pairwise coupler 30 having two core pairs 301, 302. Coupler 30 comprises a multicore conduit 31 having two signal cores 311, 312 and having a multicore input endface 313 suitable for connection to a TMCF. Coupler 30 further includes first and second pump input fibers 32, 33 having respective single pump cores 321, 331, and input endfaces 322, 332 that are suitable for connection to a pump light source. Each signal core 311, 312 is paired with a corresponding pump core 321, 331.

Coupler 30 further includes an adiabatically tapered section 34 that, as discussed below, is configured to provide "one-way" coupling between the pump core and signal core of each core pair. As a result of one-way coupling, pump light and signal light in each core pair are combined and provided as an output at the coupler output endface 35. As discussed below, depending upon the coupling direction, the combined light from each core pair is provided as an output by either the pump core or the signal core, but not both.

Figure 4:
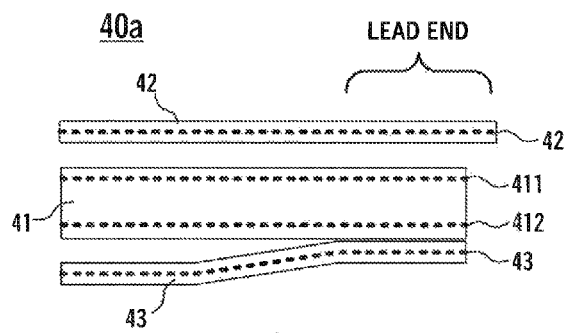
FIGS. 4-6 are a series of diagrams illustrating an exemplary technique for fabricating a pairwise coupler.
Figure 5:
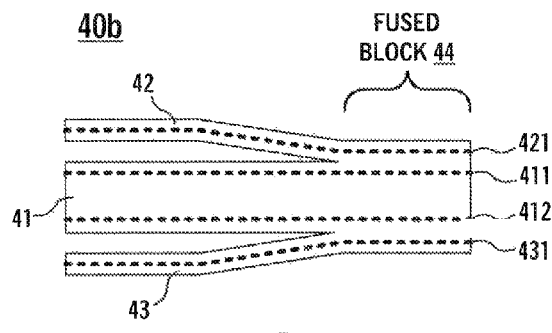
Figure 6:
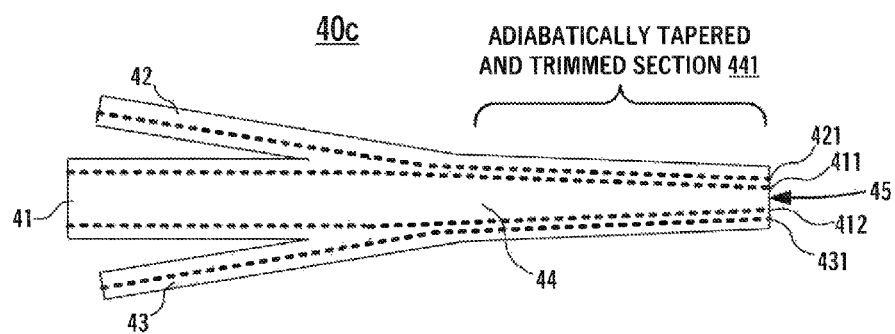

FIGS. 4-6 are simplified drawings provided a general overview of an exemplary technique for fabricating a pairwise coupler.

The depicted coupler can be fabricated by assembling together a segment of a TMCF with N signal cores and a set of N single-core pump fibers, with the cores of the pump fibers aligned with respective cores at the outer circumference of the TMCF.

FIG. 4 shows a cross section diagram of a set of coupler components 40a, comprising a TMCF segment 41 having an upper and lower signal cores 411, 412 and two pump fiber segments 42, 43 having respective single cores 421, 431 corresponding respectively to the upper and lower signal cores 411, 412. In FIG. 4, the lead end of the lower pump fiber segment 43 is assembled, against a corresponding portion of the outer surface of the TMCF segment 41.

As described in further detail below, according to a further aspect of the invention, a portion of the outer circumference of the lead end of the TMCF segment, and a corresponding portion of the outer cladding of each pump fiber, are removed in order to allow the respective cores of the TMCF and the pump fibers to be positioned as close to each other as possible.

FIG. 5 shows a diagram of the partially fabricated coupler 40b, after the TMCF 41 and the pump fibers 42, 43 have been assembled together, and after the lead end of the assembly is healed to cause the fibers 41-43 to fuse together into a block 44.

FIG. 6 shows a diagram of the finished coupler 40, after a section of the fused block 441 has been tapered adiabatically and trimmed to create a coupler endface 45 having a core configuration matching that of an AMCF. The distal, non-fused ends of the TMCF 41 segment and pump fibers 42, 43 provide connection leads into the coupler block 44. During the fabrication process, care is taken to preserve the properties of each individual core extending through the input fibers and the coupler body.

FIGS. 7A-7D, 8, and 9 are a series of diagrams illustrating aspects of an exemplary coupler comprising six core pairs.

Figure 7A:
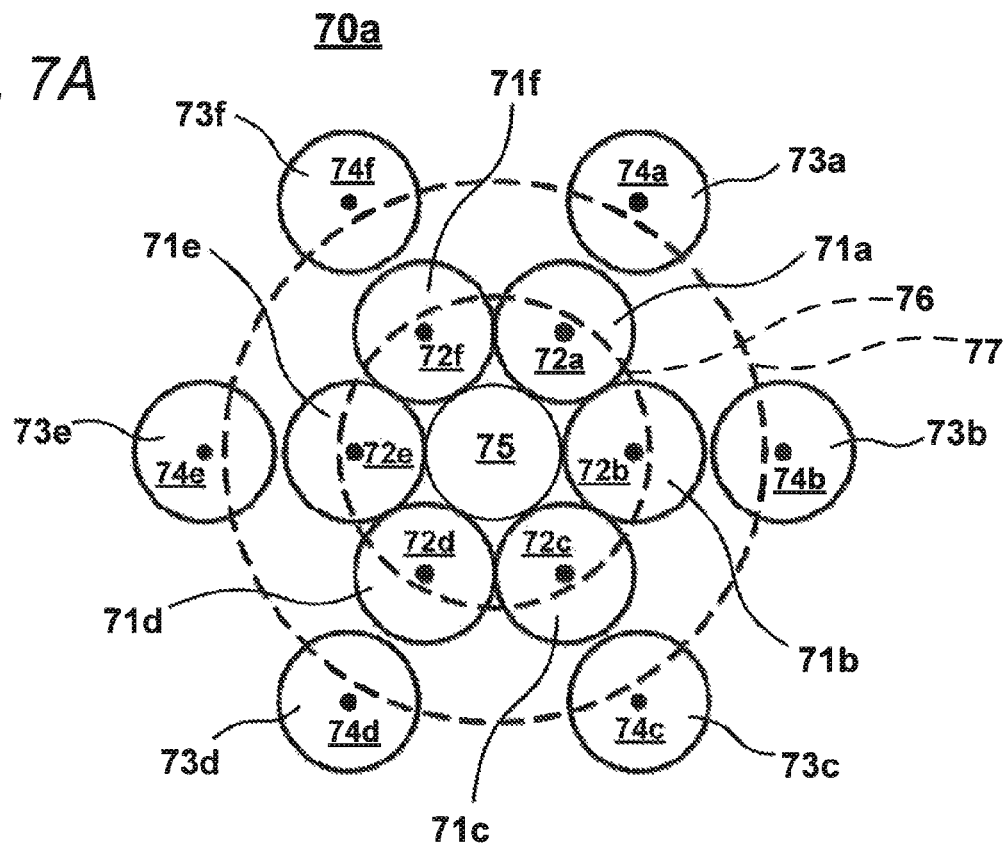
FIG. 7A is a cross section end view of a set of pairwise coupler components, comprising six signal fiber segments, six pump fiber segments, and a central support rod.

FIG. 7A is a cross section end view of a set of coupler components 70a, comprising:

six signal fiber segments 71a-f, each having a single respective signal core 72a-f;

six pump fiber segments 73a-f, each having a single respective pump core 74a-f; and a central support rod 75.

Additional structures, such as tubes or rods, may be used to provide structural support, or for other purposes. Also, the multicore conduit may be provided by an already existing multicore fiber having suitable characteristics.

Figure 7B:
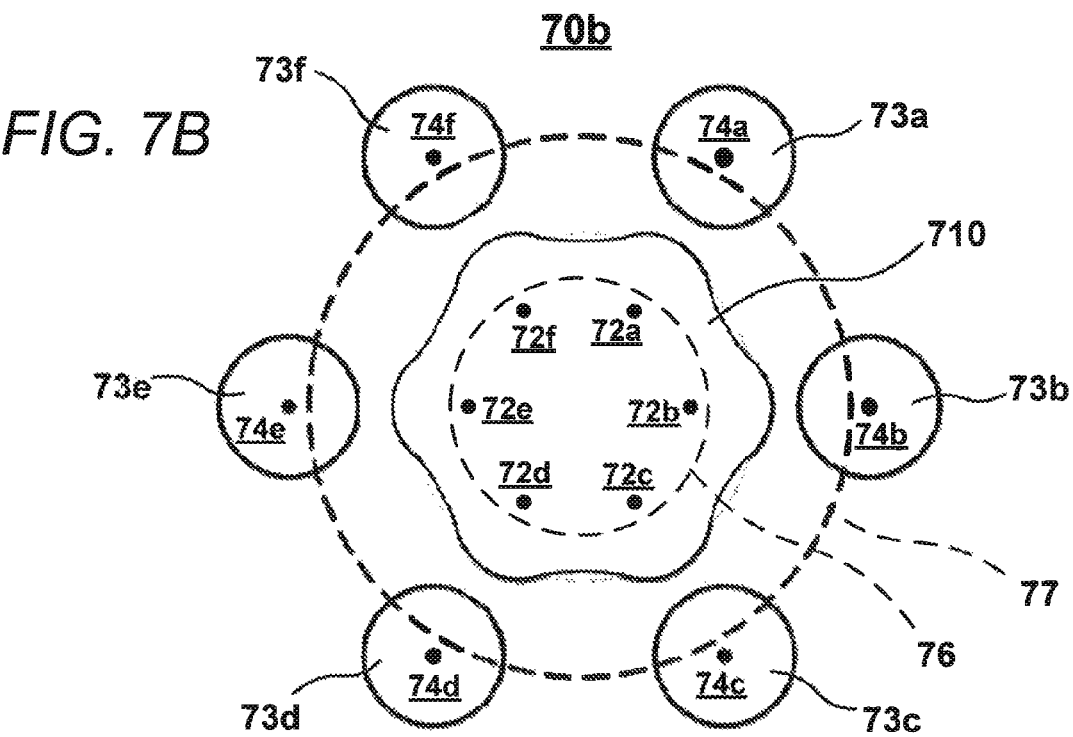
FIG. 7B is a diagram of a partially completed coupler, in which the six signal fibers and support rod have been fused together to form a single multicore conduit.

FIG. 7B is a diagram of a partially completed, coupler 70b, in which the six signal fibers 71a-f and support rod 75 have been fused together to form a single multicore conduit 710.

Figures 7C, 7D:
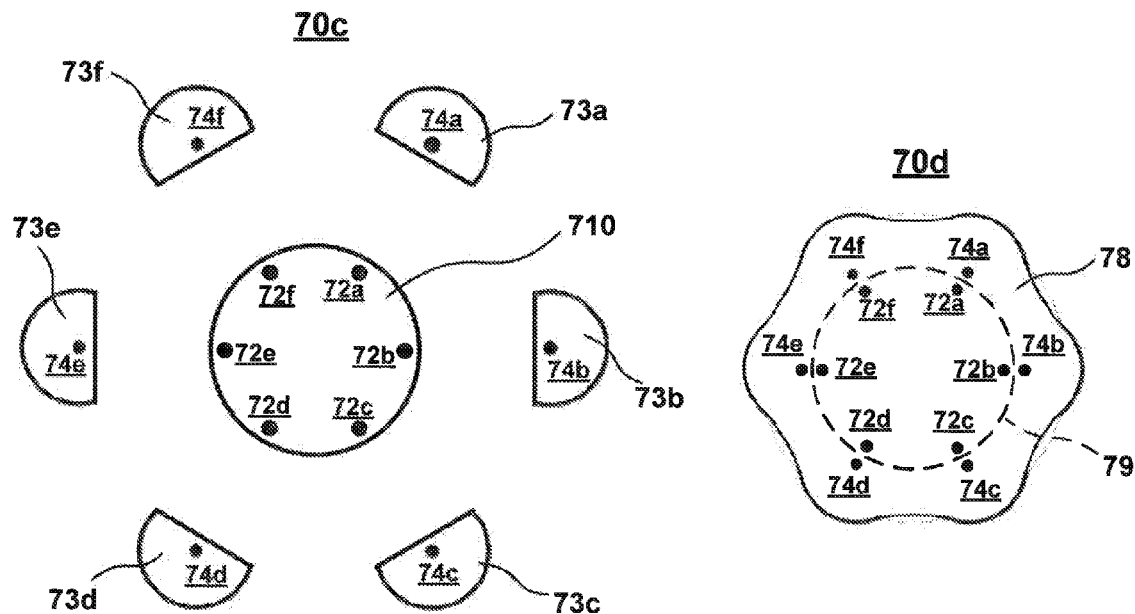
FIG. 7C is a diagram of a partially completed coupler after a portion of the cladding of each signal fiber segment and a portion of the cladding of each pump fiber segment have been removed.
FIG. 7D is a cross section diagram of the finished coupler after the pump fiber segments and multicore conduit have been fused together.

As mentioned above with respect to the coupler illustrated in FIGS. 4-6 and as further described below, a portion of the cladding of each signal, fiber segment 71a-f and a portion of the cladding of each pump fiber segment 73a-f (i.e., the cladding between the two dashed circles 76 and 77 in FIGS. 7A and 7B) is removed to allow the signal cores and pump cores to achieve the proximity required for coupling. FIG. 7C is a diagram of a partially completed, coupler 70c after the cladding has been removed.

FIG. 7D is a cross section diagram of the finished coupler 70d, after the pump fiber segments 73a-f and multicore conduit 710 shown in FIG. 7C have been fused together. The signal cores 72a-f are located inside of dashed circle 79; the pump cores 74a-f are located outside of dashed circle 79.

Figure 8:
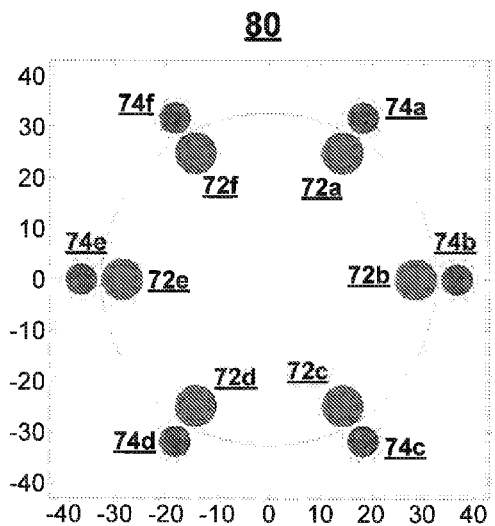
FIG. 8 is a graphical representation of the arrangement of the pump cores and signal cores at an output endface of the multicore pairwise coupler illustrated in FIGS. 7A and 7B.

FIG. 8 shows a graph 80 indicating the respective positions and sizes of the signal cores 72a-f and the pump cores 74a-f in the finished coupler. The signal cores 72a-f are configured to suppress mode coupling (i.e., "crosstalk") between neighboring cores.

Figure 9:
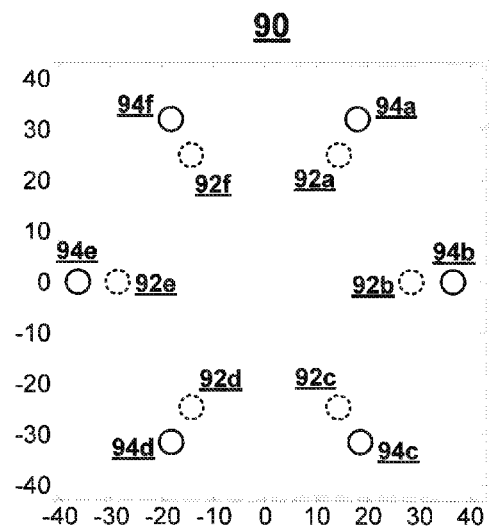
FIG. 9 is a graphical representation of the orientation of the individual cores of an amplifier multicore fiber corresponding to the core arrangement, illustrated in FIG. 8.

FIG. 9 is a graph 90 indicating the respective positions of the cores of an exemplary AMCF to which the output of the pairwise coupler is to be connected. The solid circles 94a-f in FIG. 9 indicate the AMCF core locations, where the coupler output cores are the pump cores. The dashed circles 92a-f in FIG. 9 indicate the AMCF core locations, where the coupler output cores are the signal cores.

3. One-Way Coupling

There are now described structures and techniques for configuring a pairwise coupler so as to create one-way coupling between the pump core and signal core in a core pair.

Generally speaking, maximum coupling efficiency at a given wavelength occurs when there is a matching of the respective effective indices $n_{eff}$ of two paired cores. Tapering of the coupler causes a change in core geometry, thereby resulting in a change in effective index $n_{eff}$. The coupling is "one way" in the sense that the signal and pump experience very different levels of coupling. This is essential to the combining function: signal and pump are guided in separate cores at one end of the coupler. Due to one-way coupling (e.g., coupling of signal into the pump core without coupling of the pump), signal and pump are guided together in the same core at the other end of the coupler. This can be implemented by making the coupling wavelength-dependent as explained below.

It is noted that before coupling, the signal and pump wavelengths are respectively transmitted exclusively at the signal and pump cores. When in a given region the geometry of the paired cores is configured to achieve index-matching at either the signal or pump wavelength, the coupler permits one-way coupling at the selected index-matching wavelength. It is further noted that the devices described herein are reciprocal devices, which behave similarly with light propagating left-to-right as right-to-left. The term "one-way" refers to wavelength dependency and the notion that pump and signal light propagate in a preferred direction, i.e., moving from source to a utilization device, such as an amplifier.

It is possible to configure two paired cores, such that their respective effective indices vary at different rates in response to tapering, and such that at some point along the tapered fiber region, there is an index-matching point, at which maximum coupling occurs.

Figure 10:
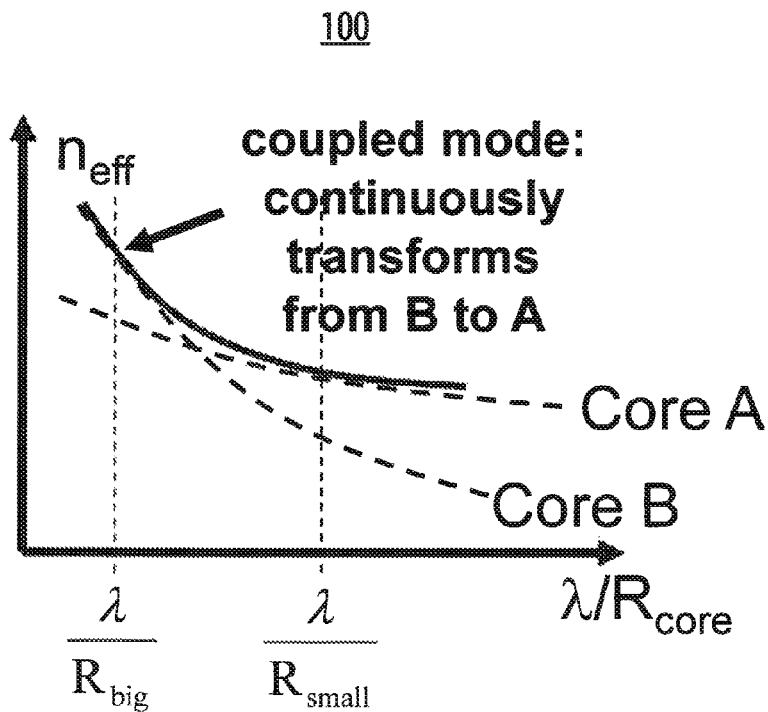
FIG. 10 is a graph illustrating coupling between paired first and second cores in a pairwise coupler.

FIG. 10 shows a graph 100 illustrating the relationship between effective index $n_{eff}$ and core radius $R_{core}$ for a pair of hypothetical cores. Core A and Core B, configured in this way. In graph 100, effective index $n_{eff}$ is plotted as a function of $\lambda/R_{core}$, i.e., wavelength divided by core radius.

In graph 100, it is assumed that paired cores A and B are tapered from an untapered input radius $R_{big}$ to a tapered output radius $R_{small}$. As the tapering proceeds, the respective effective indices at wavelength $\lambda$ of cores A and B converge until they reach a matching point. After the matching point, there is a divergence of the respective effective indices.

It is assumed that a light at wavelength $\lambda$ is launched into the input end of Core B. As the light approaches the index-matching point, there will be increasing coupling of the two cores. The amount of coupling will reach a maximum at the index-matching point. The subsequent divergence of the respective effective indices of the two cores will cause an increasing amount of light to be guided by the higher-index core, i.e., Core A. Thus, the overall result will be that light launched as an input into Core B will be transferred to Core A.

According to an aspect of the invention, adiabatic tapering is used, to provide the described "one-way" coupling between the signal core and pump core in a core pair. It will be appreciated that, assuming that Core A and Core B are adiabatically (i.e., gradually) tapered, the precise location of the index-matching point is not critical to successful coupling of light at wavelength $\lambda$ from Core B to Core A.

Figure 11:
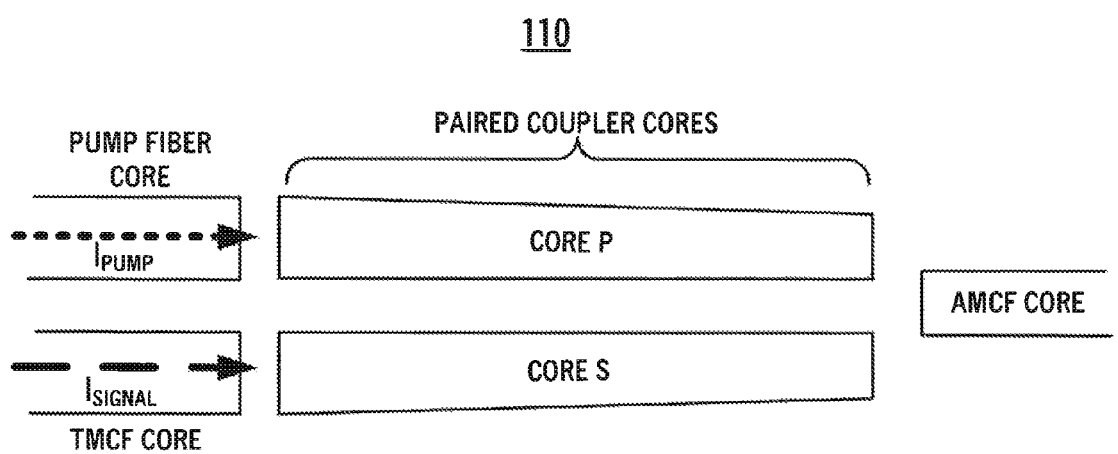
FIG. 11 is a simplified diagram of an exemplary core pair comprising a pump core and a signal core.

FIG. 11 shows a simplified diagram, not drawn to scale, of a matched coupler core pair 110, comprising a coupler pump core (Core P), and a coupler signal core (Core S). Core P is connected to a pump fiber core from which it receives a pump light input at a pump wavelength $\lambda_{PUMP}$, e.g., 980 nm. Core S is connected to a TMCF core from which it receives a signal light input at a signal wavelength $\lambda_{SIGNAL}$, e.g., 1550 nm.

According to an aspect of the invention, each coupler core pair is configured such that a transfer of light occurs in one direction only, i.e., from Core P to Core S, or from Core S to Core P. After this "one-way" coupling, both the pump light and the signal light are guided by the same core, which is connected, to a respective AMCF core.

Figure 12:
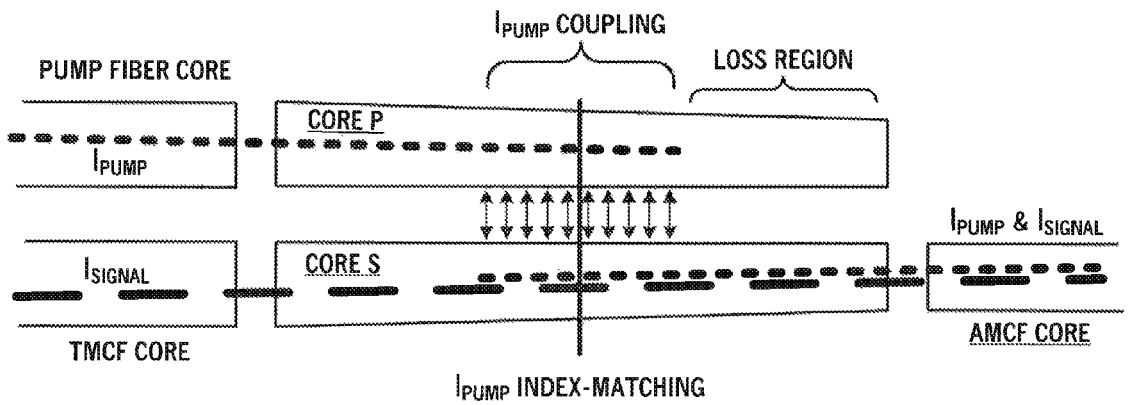
FIG. 12 is a diagram illustrating one-way coupling of pump light out of the pump core into the signal core in the exemplary core pair shown in FIG. 11.

FIG. 12 is a simplified diagram illustrating a first coupler configuration 120, in which the above-described one-way coupling proceeds in the "P-to-S" direction. Signal light propagates directly through Core S, without coupling into Core P. Pump light, on the other hand, is launched into Core P, but is then coupled into Core S where it is combined with the signal light. The combined pump and signal light is then fed into the AMCF core through a connection between Core S and the AMCF core.

Figure 13:
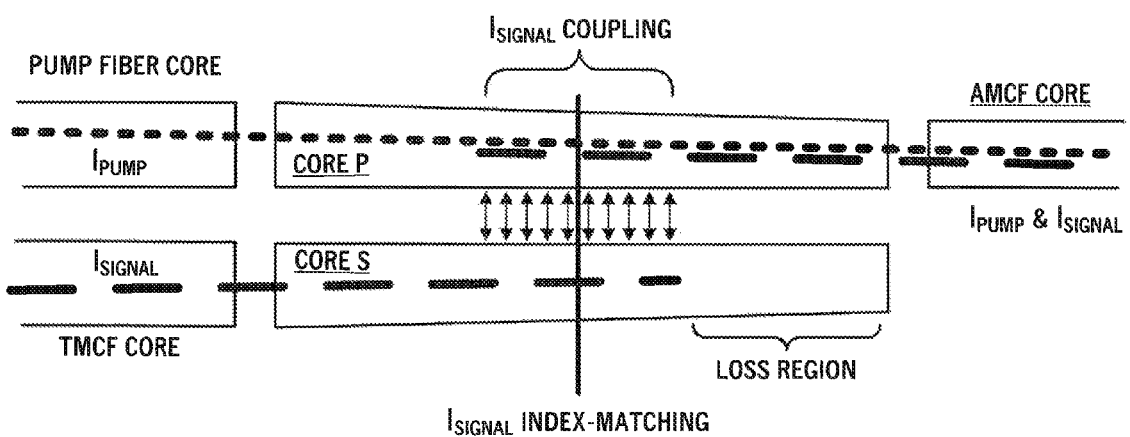
FIG. 13 is a diagram illustrating one-way coupling of signal light out of the signal core into the pump core in the exemplary core pair shown in FIG. 11.

FIG. 13 is a simplified diagram illustrating a second coupler configuration 130, in which the above-described one-way coupling proceeds in the "S-to-P" direction. Pump light propagates directly through Core P, without coupling into Core S. Signal light, on the other hand, is launched into Core S, but is then coupled into Core P, where it is combined with the pump light. The combined pump and signal light is then fed into the AMCF core through a connection between Core P and the AMCF core.

Each of these options is now described in greater detail.

4.1 One-Way Coupling from P Core to S Core

In the first option, pump light is coupled out of Core P into Core S. The signal light is left where it is (i.e., in Core S). Any pump light remaining in Core P after coupling is lost. For the purposes of illustration, this loss is depicted in FIG. 12 as occurring in a marked "loss region" of Core P. To achieve high pumping efficiency, P-to-S coupling of the pump light must be maximized, and pump light ending up in the loss region must be minimized.

Further, any signal light that is coupled out of Core S into Core P also ends up in the loss region and is lost at the end of the coupler. Therefore, in order to achieve low insertion loss, S-to-P coupling of signal light must be minimized.

In addition, in order to reduce crosstalk, there should be little or no signal coupling between respective signal cores of neighboring core pairs. For example, in the core configuration shown in FIG. 8, there should be little or no signal coupling between the following pairs of signal cores: S1/S2, S2/S3, S3/S4, S4/S5, S5/S6, and S6/S1.

Generally speaking, P-to-S coupling may present more of a challenge than S-to-P coupling. Generally speaking, if the pump wavelength is much lower than the signal wavelength, coupling tends to be significantly lower at the pump light wavelength. Thus, tapering of the coupler in order to cause the P cores and S cores to pass through an index-matching point at the pump wavelength will typically also cause the P cores and S cores to first pass through an index-matching point at the signal light wavelength since the index-matching point at the pump wavelength generally occurs at a smaller tapered core diameter. Further, long-wavelength coupling tends to be greater than short wavelength coupling because modes become less confined at longer wavelengths. Total coupling is determined by a combination of mode confinement (e.g., as calculated by an overlap integral) with phase matching (as illustrated in effective index plots).

One approach to reduce, or eliminate, signal-to-pump coupling is to configure the P core to have a fundamental cutoff wavelength that is equal to, or less than, the signal wavelength. Light propagating in a P core at the pump wavelength signal wavelength would be relatively unaffected by the fundamental cutoff. However, light propagating at the signal wavelength would be relatively weakly guided by the pump core.

Figure 14:
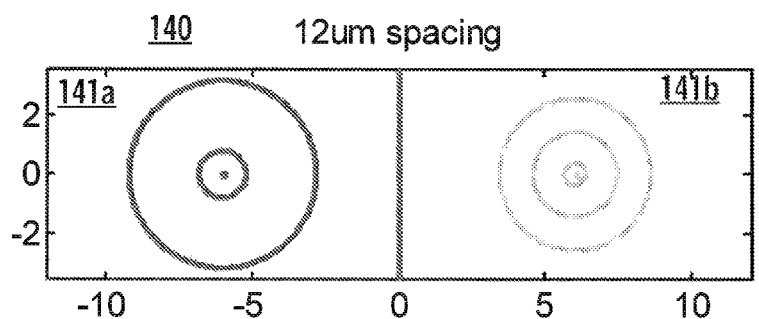
FIG. 14 is a graphical representation of the respective regions of a paired pump core and signal core according to an aspect of the invention, for providing one-way coupling out of the pump core into the signal core.
Figure 15:
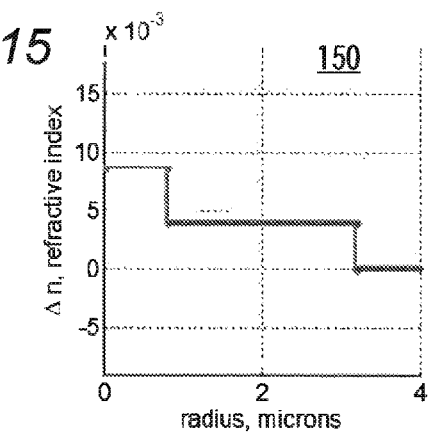
FIGS. 15 and 16 show, respectively, refractive index profiles for the pump and signal cores shown in FIG. 14.
Figure 16:
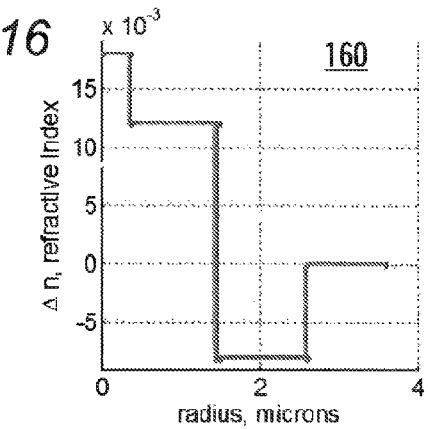
Figure 17:
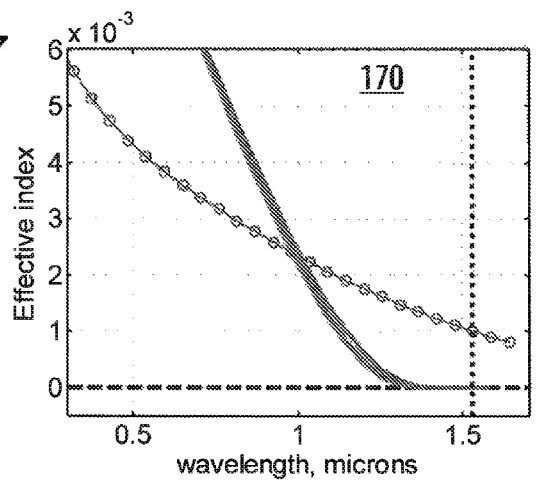
FIG. 17 is a graph illustrating the relationship between effective index and wavelength for the pump core and the signal core illustrated in FIGS. 14-16.

FIG. 14 shows a cross section of a matched P core and S core positioned in a shared, cladding with a 12 μm center-to-center spacing. FIGS. 15 and 16 show, respectively, refractive index profiles for the P core and S core. FIG. 17 shows a graph plotting effective index $n_{eff}$ as a function of wavelength for the signal core and the pump core at the index matching point for $\lambda_{PUMP}$.

As shown in graph 140, the pair of fibers has been configured such that, at the pumping light wavelength, i.e., 980 nm, the two cores have the same effective index $n_{eff}$. The signal wavelength, i.e., 1550 nm, is above the fundamental cutoff for the pump core, causing the effective index $n_{eff}$ to drop to zero (or near zero). The pump core has little or no ability to guide light at the signal wavelength, thus eliminating (or substantially eliminating) undesired coupling of signal light out of the signal core into the pump core.

The calculated loss in the depicted example is approximately 3 dB/cm at the signal wavelength (1550 nm).

4.2 One-Way Coupling from S Core to P Core

In this approach, a pump light is launched into the P core and is guided by the P core all the way through the coupler. A signal light is launched into the S core and is coupled out of the S core into the P core, where it is combined with the pump light. Any signal light remaining in the S core after coupling is lost. For the purposes of illustration, this loss is depicted in FIG. 13 as occurring in a marked "loss region" of Core S. To achieve low insertion loss, S-to-P coupling of the signal light must be maximized, and signal light ending up in the loss region must be minimized.

Further, any pump light that is coupled out of the P core into the S core also ends up in the loss region and is lost at the end of the coupler. Thus, to achieve high pump efficiency, it is desired to minimize coupling of the pump.

In addition, in order to reduce crosstalk, there should be little or no signal coupling between respective signal cores of neighboring core pairs. For example, in the core configuration shown in FIG. 9, there should be little or no signal coupling between the following pairs of signal cores; S1/S2, S2/S3, S3/S4, S4/S5, S5/S6, and S6/S1.

The implementation of S-to-P coupling is more straightforward than P-to-S coupling. If pump wavelength is much lower than signal wavelength, coupling tends to be much lower for pump, both because of confinement and because of phase matching, as discussed above. The pump wavelength is generally more confined within the core region than the signal wavelength. The coupling bias in favor of S-to-P coupling means that it is possible to avoid P-to-S coupling without using a fundamental cutoff, or the like.

According to an aspect of the invention, one-way coupling in the S-to-P direction is accomplished by employing an adiabatic wavelength-sensitive coupler, wherein the fiber radius is tapered from $R_{big}$ to $R_{small}$, thereby causing a gradual, wavelength-dependent change in effective refractive index. Because of the coupling bias at the signal wavelength, it is possible to configure the taper and the pump and signal cores such that the index-matching point for the signal wavelength occurs significantly earlier along the taper than the index-matching point for the pump wavelength.

Figure 18:
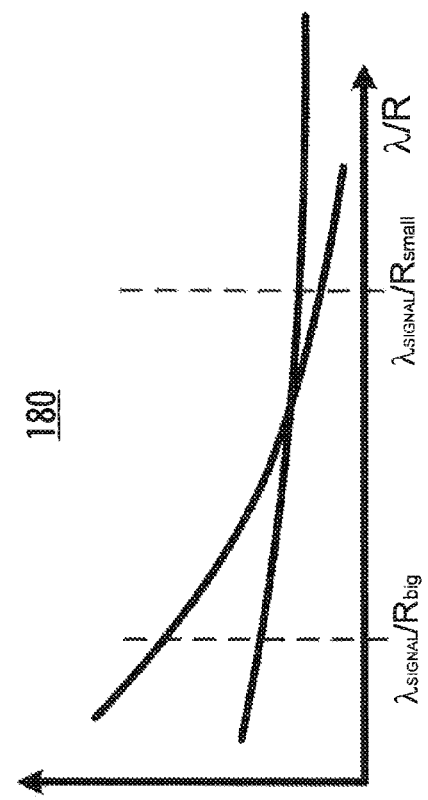
FIG. 18 is a graph illustrating the relationship between effective index and coupler inverse radius at a signal wavelength for an exemplary pump core and paired signed core.
Figure 19:
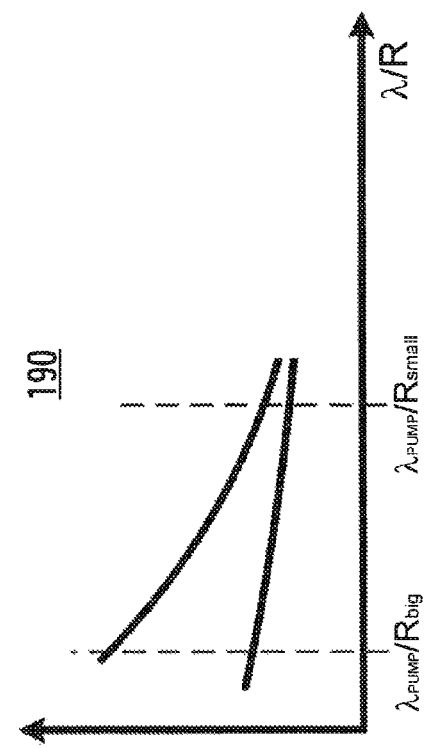
FIG. 19 is a graph illustrating the relationship between effective index and coupler inverse radius at a pump wavelength for an exemplary pump core and paired signal core.

FIGS. 18 and 19 show a pair of graphs 180 and 190, illustrating the relationship between refractive index $n_{eff}$ and $\lambda/R$ for the pump core and the signal core for light at the signal wavelength (FIG. 18)

Graphs 180 and 190 illustrate the relative simplicity of S-to-P coupling compared with over P-to-S coupling. Potential coupling in the "wrong" direction is avoided because the critical index-matching point is never reached in the taper.

Figure 20:
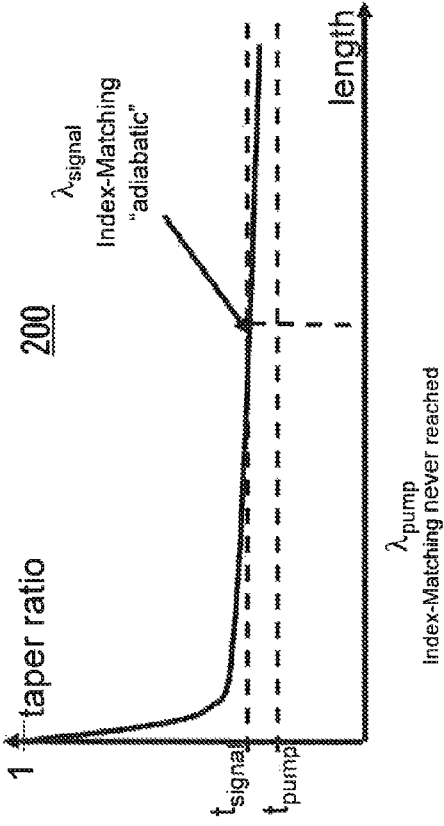
FIGS. 20 and 21 are a pair of graphs illustrating the relationship between taper ratio and coupler length in an exemplary adiabatically tapered coupler.
Figure 21:
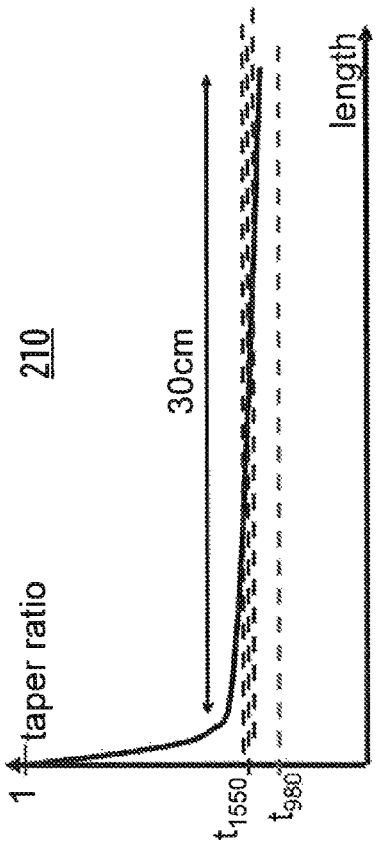

FIGS. 20 and 21 are a pair of graphs 200 and 210 illustrating the relationship between taper profile and length in an exemplary pairwise coupler according to an aspect of the invention. The taper ratio $t=R/R_{big}$ should pass through the index-matching point for the signal $t_{signal}$ (indicated by the intersection of the taper ratio curve and broken line, but not reach the index-matching point for the pump. (In other words, the taper ratio curve does not intersect broken line $t_{pump}$ at any point along the length of the pairwise coupler.)

As shown by the relatively steep initial drop, part of the taper may change rapidly, but in the region of the $\lambda_{signal}$ index-matching point the taper should change slowly, so that coupling is adiabatic, or as close to adiabatic as possible.

Generally speaking, the coupling strength determines the adiabatic condition, and thus a suitable length for the coupling region. Coupling induces a periodic split Δn between the effective indices of otherwise index-matched modes. The period of this split is the beat length $L_{beat}$.

The adiabatic condition comprises a variation in core radius r that occurs slowly on the beat length $L_{beat}$, i.e., $$\frac{dr}{dz} \ll \frac{r}{L_{beat}},$$

where $$\frac{dr}{dz}$$

is the rate of change of core radius r as a function of axial position z.

Further, a suitable adiabatic region has a length $L_{taper}$ that is significantly greater than $L_{beat}$, i.e.:

$$L_{taper} \gg L_{beat}.$$

Beat length $L_{beat}$, can be estimated based upon the relationship $$L_{beat} \approx \frac{\lambda}{\Delta n}.$$

In that case, $$\frac{r}{L_{beat}} \approx \frac{r\Delta n}{\lambda},$$

and the adiabatic condition comprises:

$$\frac{dr}{dz} \ll \frac{r\Delta n}{\lambda}$$

and $$L_{taper} \gg \frac{\lambda}{\Delta n}.$$

The split $\Delta n$ can be estimated, for example, using standard overlap integral approximations. One possible approximation can be expressed as follows:

$$\Delta n/2 \approx c_0 \equiv \frac{1}{2n_{silica}} \int dA \Psi_A^* \Psi_B (n^2 - n_A^2)$$

As indicated by the above equation, $\Delta n \approx 2c_0$

Thus, the adiabatic condition can also be expressed with respect to coupling strength $c_0$, through the following relationship:

$$L_{beat} \approx \frac{\lambda}{2c_0}.$$

Using this approximation of beat length $L_{beat}$, it follows that:

$$\frac{r}{L_{beat}} \approx \frac{r 2 c_0}{\lambda}$$

Thus, the adiabatic condition can be stated as follows:

$$\frac{dr}{dz} \ll \frac{r 2 c_0}{\lambda}$$

and $$L_{taper} \gg \frac{\lambda}{2c_0}.$$

For example, assuming a wavelength $\lambda=1550$ nm and $\Delta n \approx 2c_0 \approx 2 \times 10^{-5}$, then;

$\lambda/c_0 \approx 1550$ nm$/(2 \times 10^{-5}) \approx 8$ cm

In this example, an adiabatic region having a length of ~30 cm has been determined to be suitable. Larger tapers may have better performance, but are harder to fabricate.

The use of an approximation based on coupling strength $c_0$ suggests a measured quantity for beat length $L_{beat}$; the use of an approximation based on effective index difference $\Delta n$ suggests a calculated value. In practice, an approximation based on coupling strength $c_0$ may be preferable.

As shown in graph 210 (FIG. 21), the length of the adiabatic tapering region allows for some variation in $t_{1550\ nm}$, thus accommodating small variations in the S and P cores arising, for example, as a result of manufacturing techniques, operating conditions, or from other causes.

Figure 22:
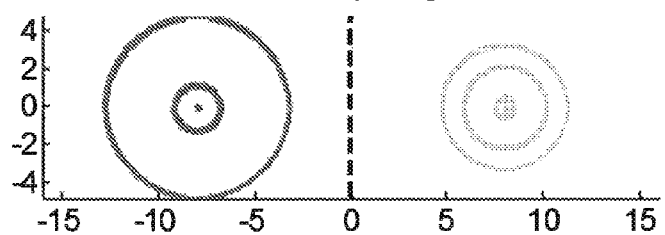
FIG. 22 is a graphical representation of the respective regions of a paired pump core and signal core according to an aspect of the invention, for providing one-way coupling out of the signal core into the pump core.
Figure 23:
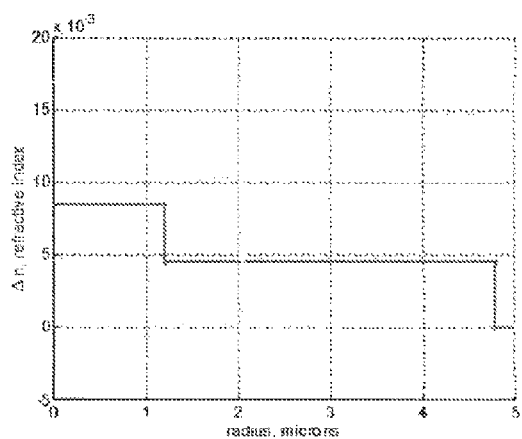
FIGS. 23 and 24 show, respectively, refractive index profiles for the pump and signal cores shown in FIG. 22.
Figure 24:
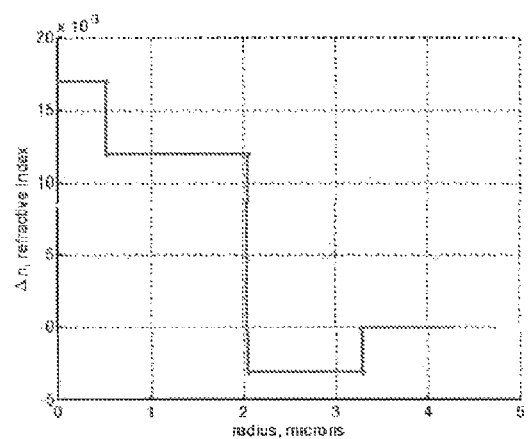

FIG. 22 shows a cross section diagram of an index-matched pump core and signal core suitable for use in an S-to-P pairwise coupler configuration. FIGS. 23 and 24 show respective refractive index profiles 230 and 240 for the pump core and signal core.

Figure 25:
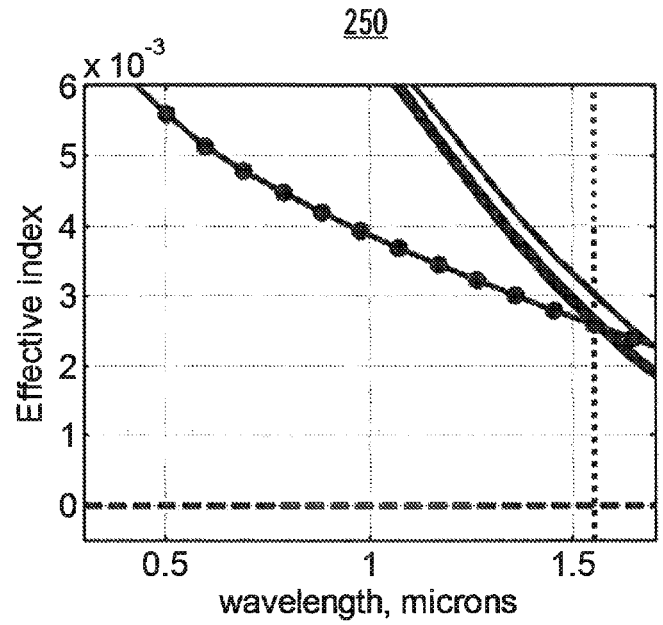
FIG. 25 is a graph illustrating the relationship between effective index and wavelength for the paired pump core and signal core illustrated in FIGS. 22-24.

FIG. 25 shows a graph illustrating the relationship between effective index and wavelength, for the two cores. This core pair displays a coupling strength $c_0 \approx 2 \times 10^{-5}$ at a core spacing of approximately 16 μm ($\lambda=1550$ nm). The P core is single-mode at 980 nm. The 980 nm coupling is expected to be negligible.

Figure 26:
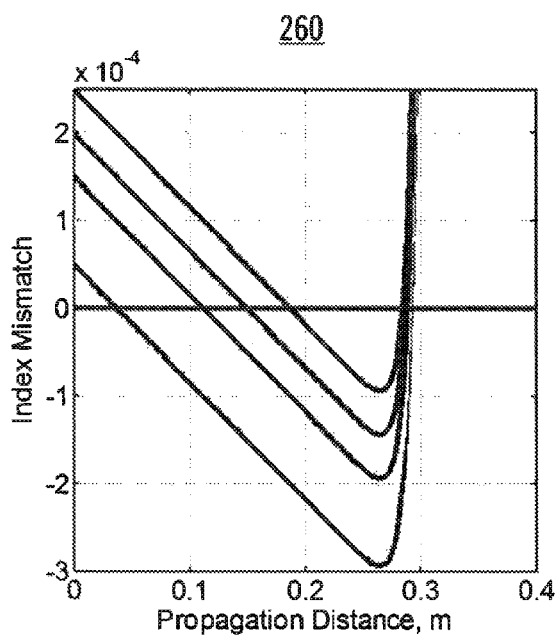
FIGS. 26 and 27 are a pair of graphs illustrating power conversion achievable using the paired pomp core and signal core illustrated in FIGS. 22-24.
Figure 27:
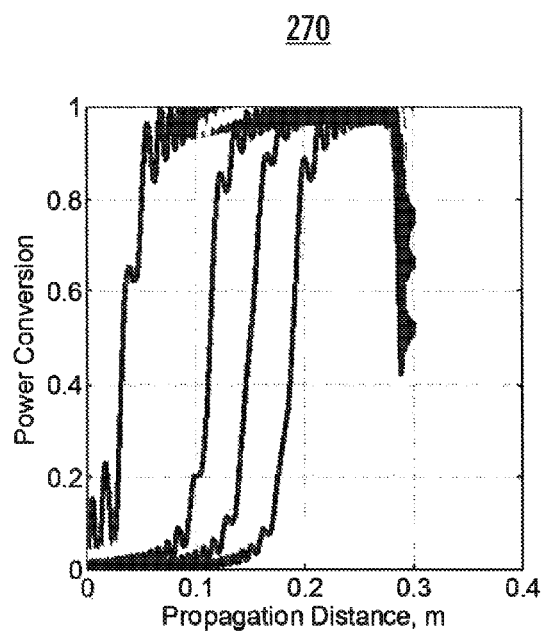

FIGS. 26 and 27 show a pair of graphs illustrating power conversion achievable by the core pair shown in FIGS. 22-24.

FIG. 26 is a graph illustrating four different taper profiles, wherein index mismatch is graphed as a function of propagation distance. The sharp upward turn at the end of the curves arise as a result of a non-adiabatic output end, in order to allow online monitoring.

FIG. 27 is a graph illustrating the estimated power conversion, graphed as a function of propagation distance. A conversion efficiency of 95% and above is estimated for a 30 cm taper with a tolerance $\Delta n \pm 10^{-4}$.

According to a further aspect of the invention, a pedestal refractive index profile is employed to achieve a relatively constant mode field diameter throughout the tapering range. The use of a pedestal refractive index profile may be advantageous, but it is not necessary for the mode field diameter to be rigorously constant.

Figure 28:
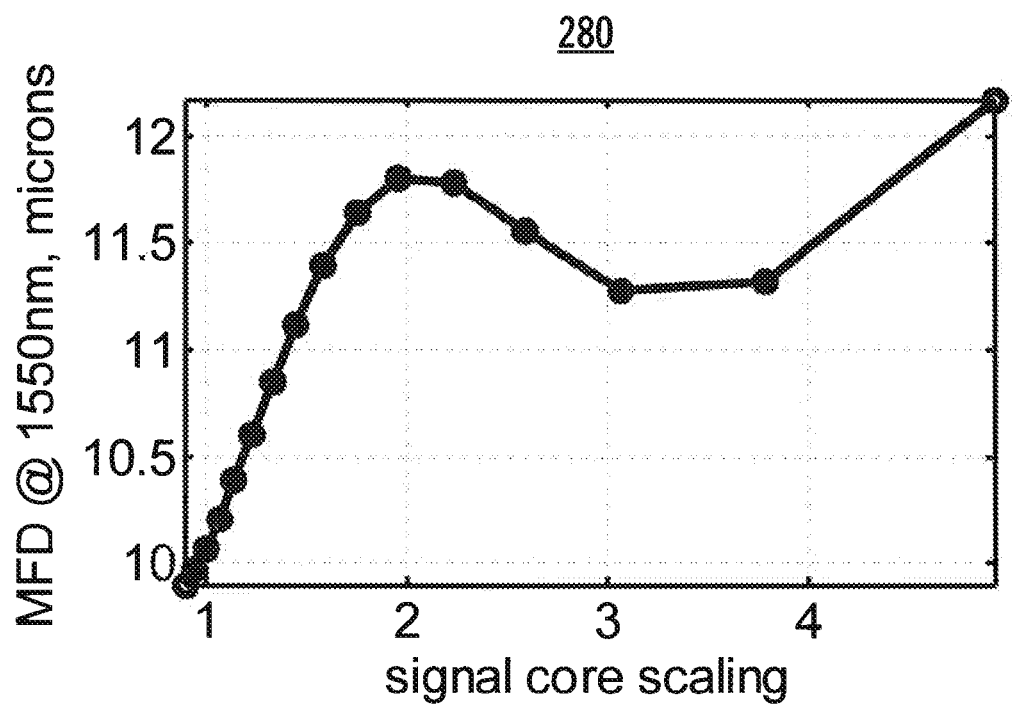
FIGS. 28 and 29 are a pair of graphs illustrating the relationship between mode field diameter and signal and pump core sealing in a multicore pairwise coupler according to a further aspect of the invention, wherein a pedestal refractive index profile is used to maintain a desired mode field, diameter along a tapering range.
Figure 29:
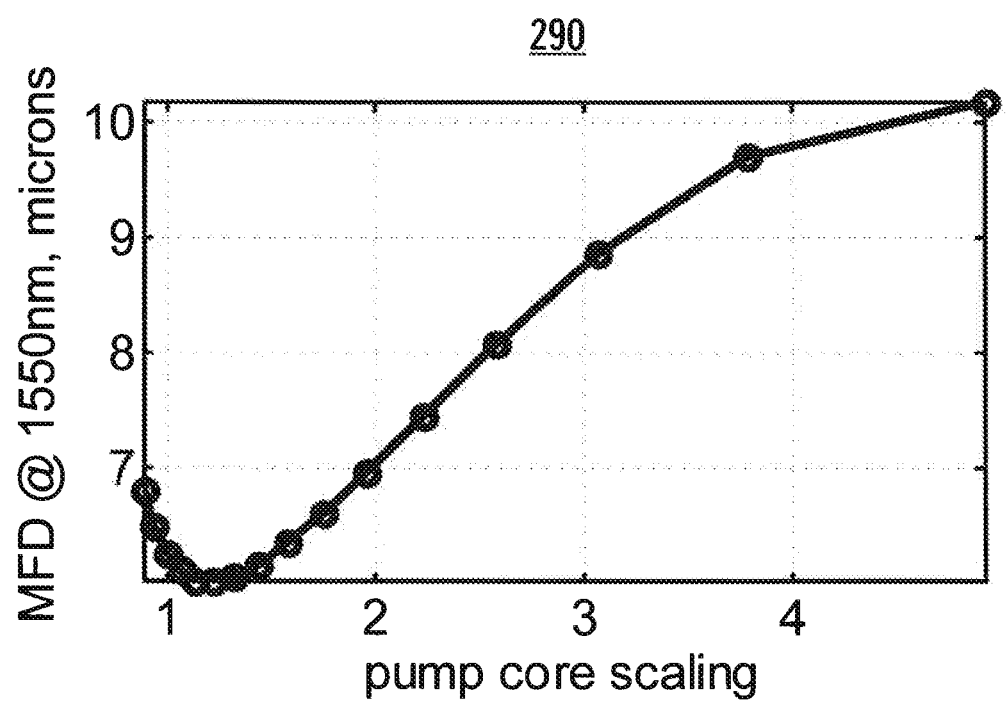

FIGS. 28 and 29 are a pair of graphs 280 and 290 showing the relationship between core scaling and mode field diameter at 1550 nm for the signal fiber (FIG. 28) and pump fiber (FIG. 29), where a pedestal refractive index profile has been employed. Here, core sealing (like the taper ratio) is proportional to ratio, but referenced to the index matched radius of the signal wavelength (that is, core scaling=t/$t_{signal}$).

5. Cladding Reduction

As discussed above, a coupler according to the present invention can be fabricated by fusing together and tapering the output ends of a multicore conduit and a plurality of pump core fibers, so as to create a plurality of paired signal and pump cores. The multicore conduit can be a length of already existing multicore fiber, or can be formed by fusing together a plurality of single-core fibers.

As further discussed above, the required distance between the pump core and signal core in each core pair is typically less than the thickness of the cladding separating the cores of two standard fibers. Thus, according to an aspect of the invention, the output ends of the multicore fiber and the pump fibers are prepared for assembly into a pairwise coupler by removing a portion of the cladding separating the signal cores and the pump cores.

Figure 30:
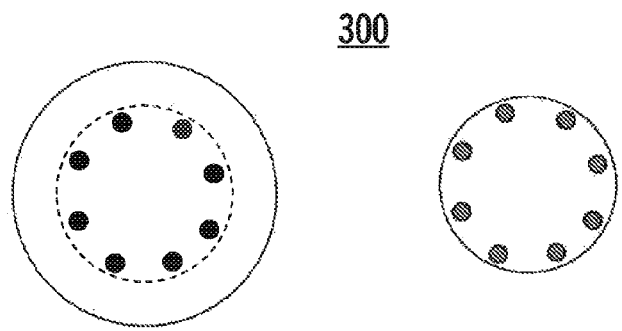
FIGS. 30-32 are a series of diagrams illustrating a technique for reducing cladding between paired signal cores and pump cores in a multicore pairwise coupler.
Figure 31:
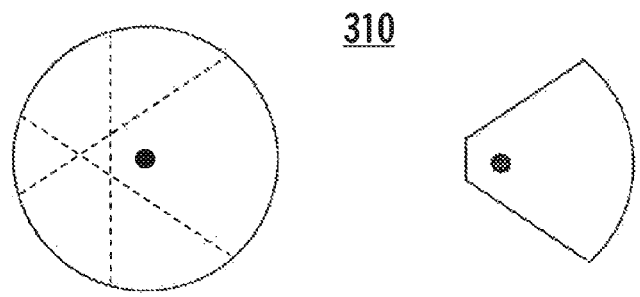
Figure 32:
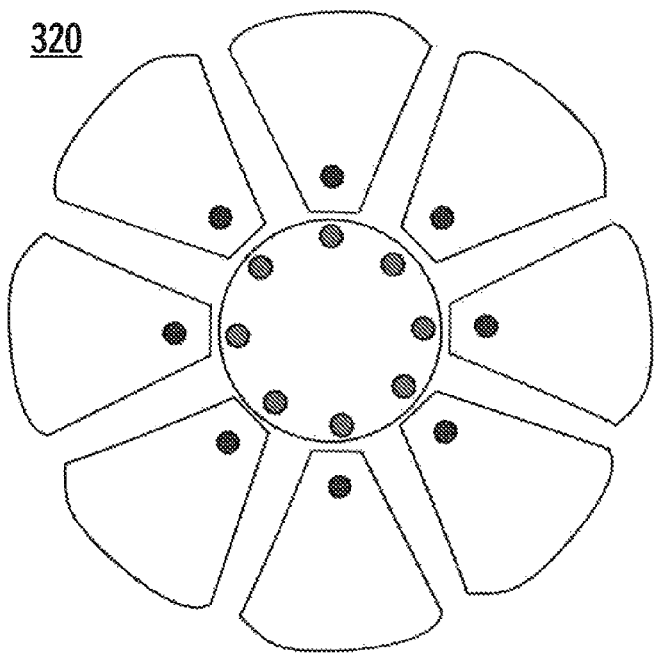

FIGS. 30-32 are a series of drawings illustrating a technique for removing a portion of the cladding from a multicore fiber segment and an exemplary pump fiber. In FIG. 30, a suitable technique, such as etching, polishing, grinding, or the like, is used to remove an outer circumferential portion, of the multicore cladding to a perimeter, marked by broken-line circle, that lies just above the six signal cores. Glass compositions may also be arranged to take advantage of selective etching to produce a desired geometry. In FIG. 31, a like technique is used to remove cladding along the broken lines to leave a wedged-shaped cross section profile having a vertex containing the pump core.

As shown in FIG. 32, a plurality of wedge-shaped pump fiber segments are arranged around a reduced multicore segment with the core-containing vertex of each wedge-shaped pump fiber segment positioned proximate to a respective signal core. The respective geometries of the multicore segment and the pump segments are configured to allow the components to be packed closely together before they are heated and fused together.

6. Scalability

The present section addresses the issue of scalability, i.e., the adaptability of the above-described pairwise coupler designs for use with a larger number of signal cores.

As discussed above, according to an aspect of the invention, a sufficiently small distance between the signal cores and their paired pump cores is achieved by bringing the signal cores close to the surface of the MCF, e.g., through a reduction of the amount of cladding at its outer circumference. Thus, in the pairwise couplers described above, the pump cores and signal cores are scalable with the outer surface of the MCF.

The present section is directed to scalability with respect to an AMCF having more cores than the TMCF, thereby allowing multiple TMCFs to be combined by a single coupler into a single AMCF. The AMCF can have a core array with a high aspect ratio (i.e., an oblong shape), or an aspect ratio equal, to, or close to, 1:1 (i.e., a square shape). In addition, depending upon, the particular application, some or all of the pump and signal cores can be multimode cores. In addition, some or all of the pump fibers can be multicore.

Figure 33:
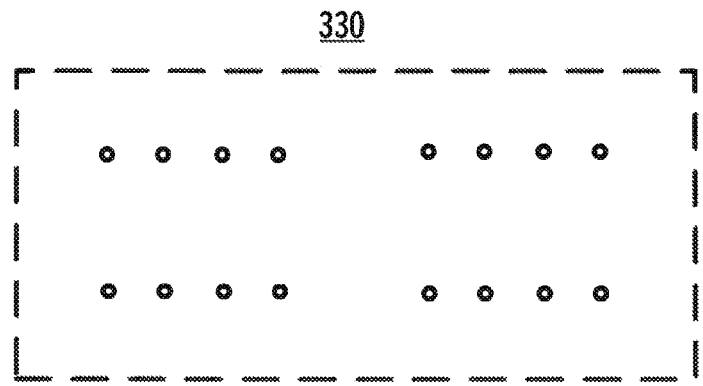
FIGS. 33-44 are a series of diagrams of exemplary pairwise coupler configurations that are scaled for use with an AMCF having a large number of cores.
Figure 34:
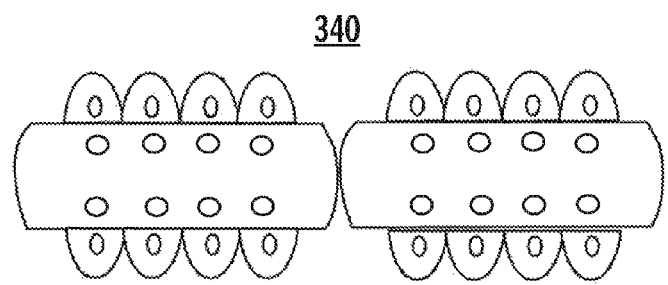

FIG. 33 shows an exemplary 2×8 AMCF core array 330 having an oblong shape, and FIG. 34 shows a diagram of a scaled pairwise coupler system 340 according to an aspect of the invention comprising first and second, multicore conduits, each comprising 8 signal cores arranged in a 2×4 array. System 340 further includes 16 single-core pump fibers, each of which is paired with a respective signal core.

Figure 35:
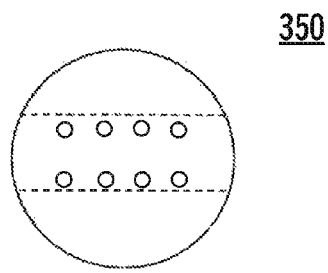
Figure 36:
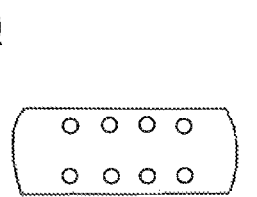

In order to achieve the necessary proximity between each paired signal core and pump core, portions of the claddings of the multicore conduit and the pump fibers are removed. FIGS. 35 and 36 show diagrams of an exemplary multicore conduit 350 (FIG. 35) and pump fiber 360 (FIG. 36) before and after removal of cladding along the broken lines. After removal of the cladding, the multicore conduit has a substantially rectangular cross sectional profile with each row of cores lying just under the surface of each long side. In the exemplary pump fiber, cladding is removed along a chord proximate to the pump core, to create a flat surface just over the pump core.

Figure 37:
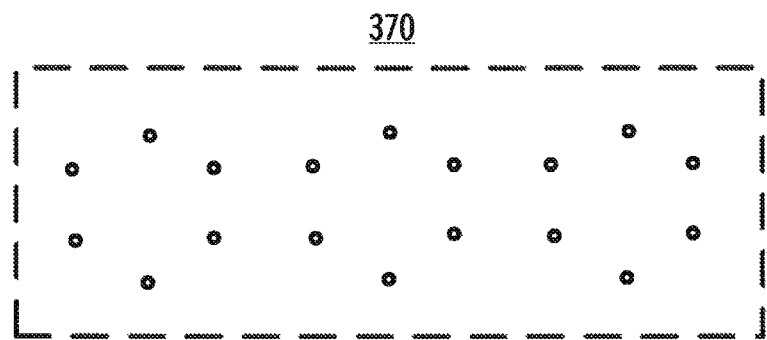

FIG. 37 shows an exemplary AMCF core array 370 comprising 18 cores arranged into 3 side-by-side hexagons with an overall oblong shape, having an aspect ratio of greater than 4:1.

Figure 38:
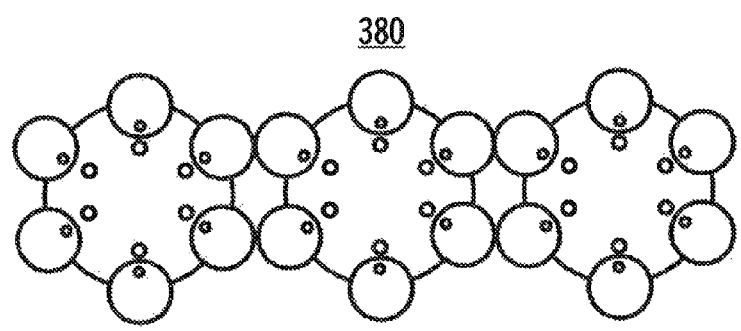

FIG. 38 shows a pairwise coupler assembly 380 comprising three 6-core multicore conduits and 18 single-core pump fibers, that are arranged in a signal-to-pomp (S-to-P) configuration, wherein the cores of the pump fibers are aligned with respective cores in the AMCF core array 370.

Figures 39, 40:
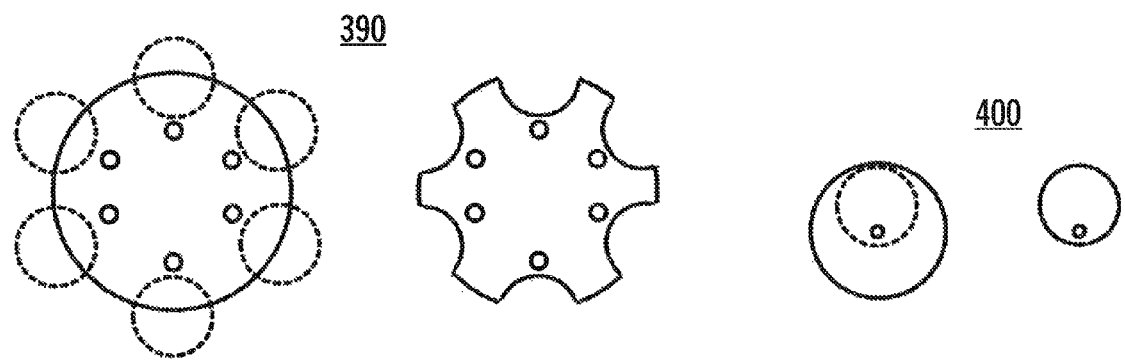

FIG. 39 shows across section diagram of a multicore conduit 390 suitable for use in assembly 380. Multicore conduit 390 is formed by providing a segment of a 6-core multicore fiber and mechanically or chemically removing the multicore fiber's outer cladding to form an arc-shaped groove over each MCF core.

FIG. 40 shows a cross section diagram of a pomp fiber 400 suitable for use in assembly 400. Pump fiber 400 is formed by providing a pump fiber segment and mechanically or chemically removing the pump fiber's outer cladding to leave a substantially circular outer profile with the pump located proximate along one side of the circle.

As shown in FIG. 38, the reduced pump fiber segments are seated into respective grooves in the multicore conduit, such that each pump core lies proximate to a paired signal core, in accordance with the above described aspects of the invention.

Figure 41:
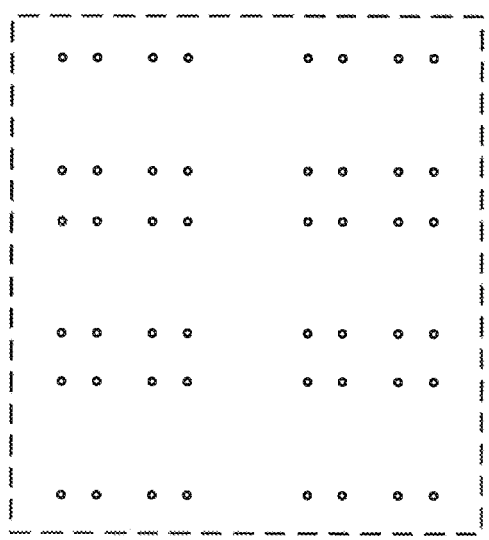
Figure 42:
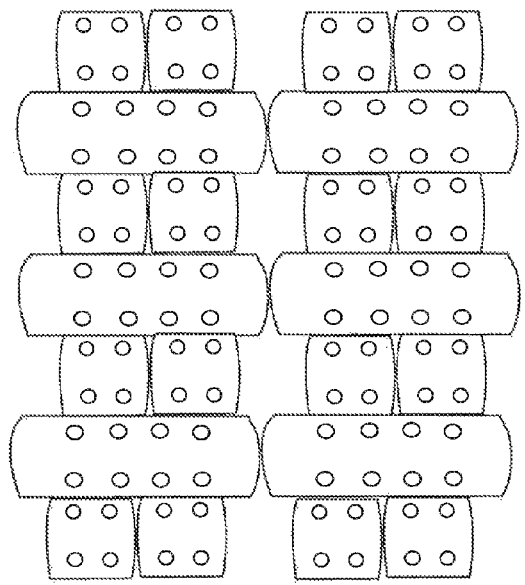
Figure 43:
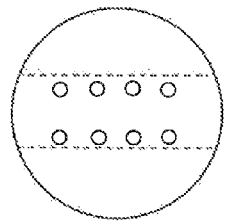
Figure 44:
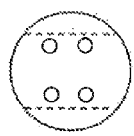
Figure 44:
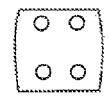

FIG. 41 shows an example of a 6×8 AMCF core array, which has an aspect ratio close to 1:1. As further illustrated in FIG. 41. In addition, the pump fibers may be implemented using multicore fibers.

Scalability of number of cores in the amplifier fiber faces different tradeoffs. For example, in certain contexts, a limitation on tight bends may be acceptable. At short lengths, small effective areas have less impact on nonlinear accumulation. Other modifications are possible.

7. Single-Core Transmission Fibers

It will be appreciated that the above described structures and techniques can also be employed in connection with transmission single-core transmission (TSCFs) instead of transmission multicore fibers (TMCFs).

Figure 45:
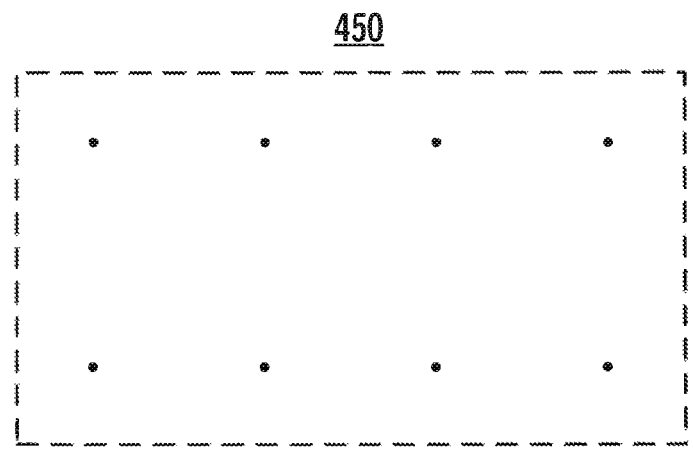
FIGS. 45-48 are a series of diagrams illustrating a further aspect of the invention directed to a pairwise coupler configuration employing a plurality of single-core transmission fibers.
Figure 46:
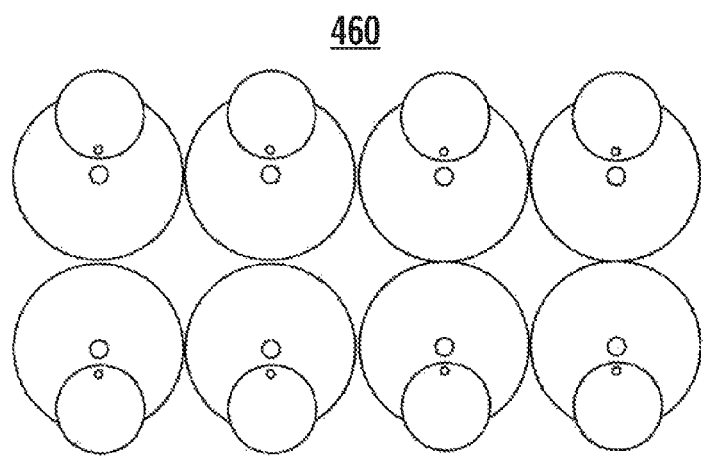
Figure 47:
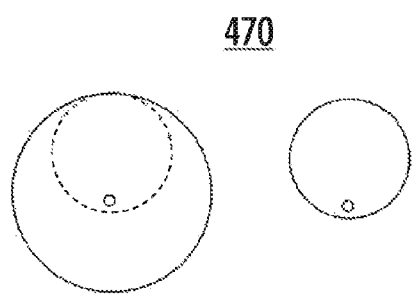
Figure 48:
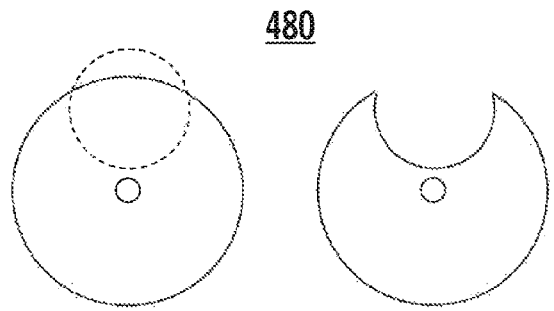

FIG. 45 shows an exemplary 2×4 AMCF core array. FIG. 46 shows a pairwise assembly of signal fibers and pump fibers, wherein the signal fibers are implemented using single-core fibers. The required proximity between the cores is achieved by removing corresponding portions of the signal fiber cladding and the pump fiber cladding, as illustrated in FIGS. 47 and 48.

Use of the described adiabatic coupling technique in conjunction with TSCFs allows the fabrication of a plurality of pump combiners in a single fabrication without the need for individual tuning.

8. Exemplary Techniques

Figure 49:
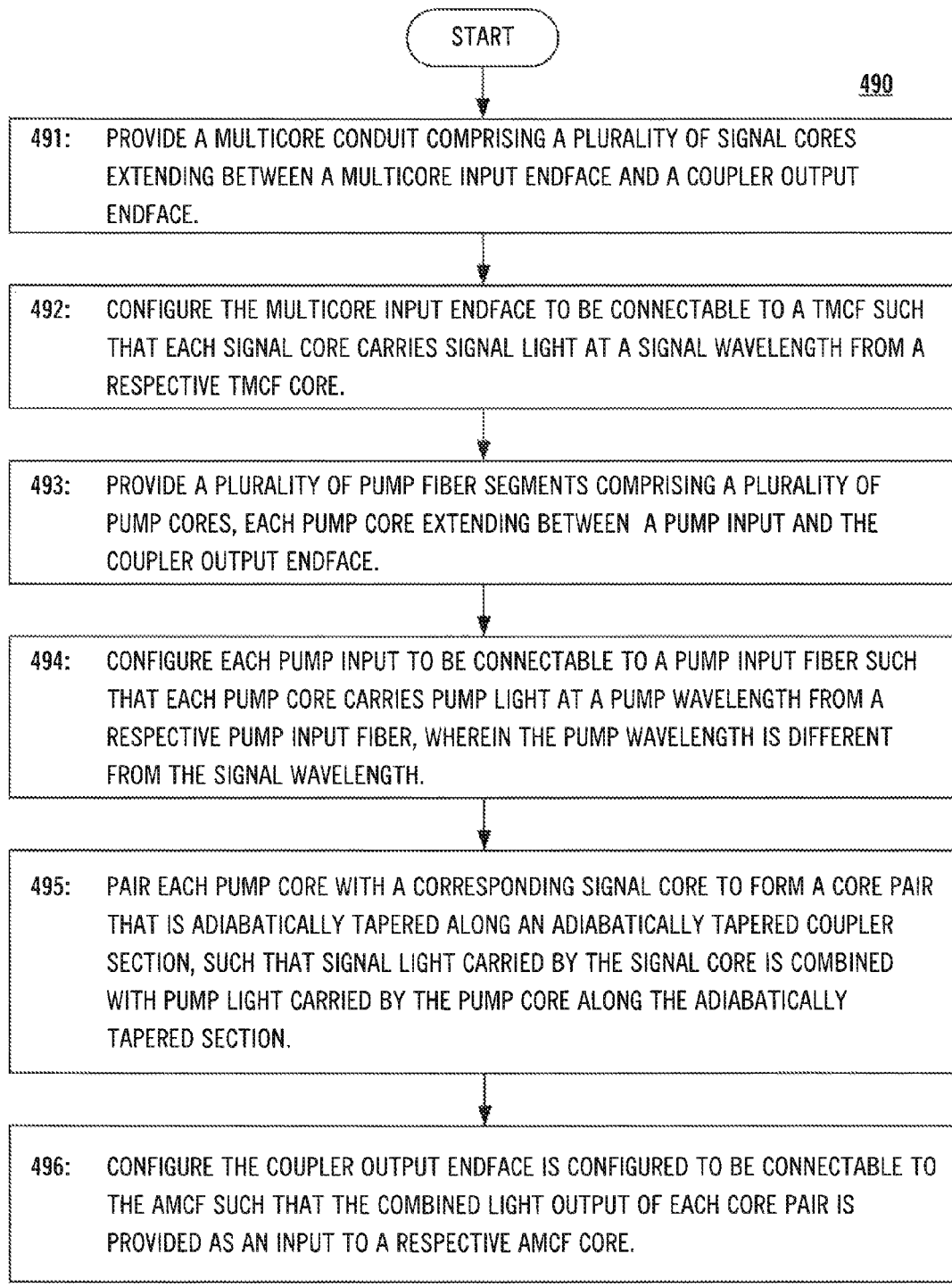
FIG. 49-51 are a series of flowcharts illustrating pairwise coupling techniques according to further aspects of the invention.
Figure 50:
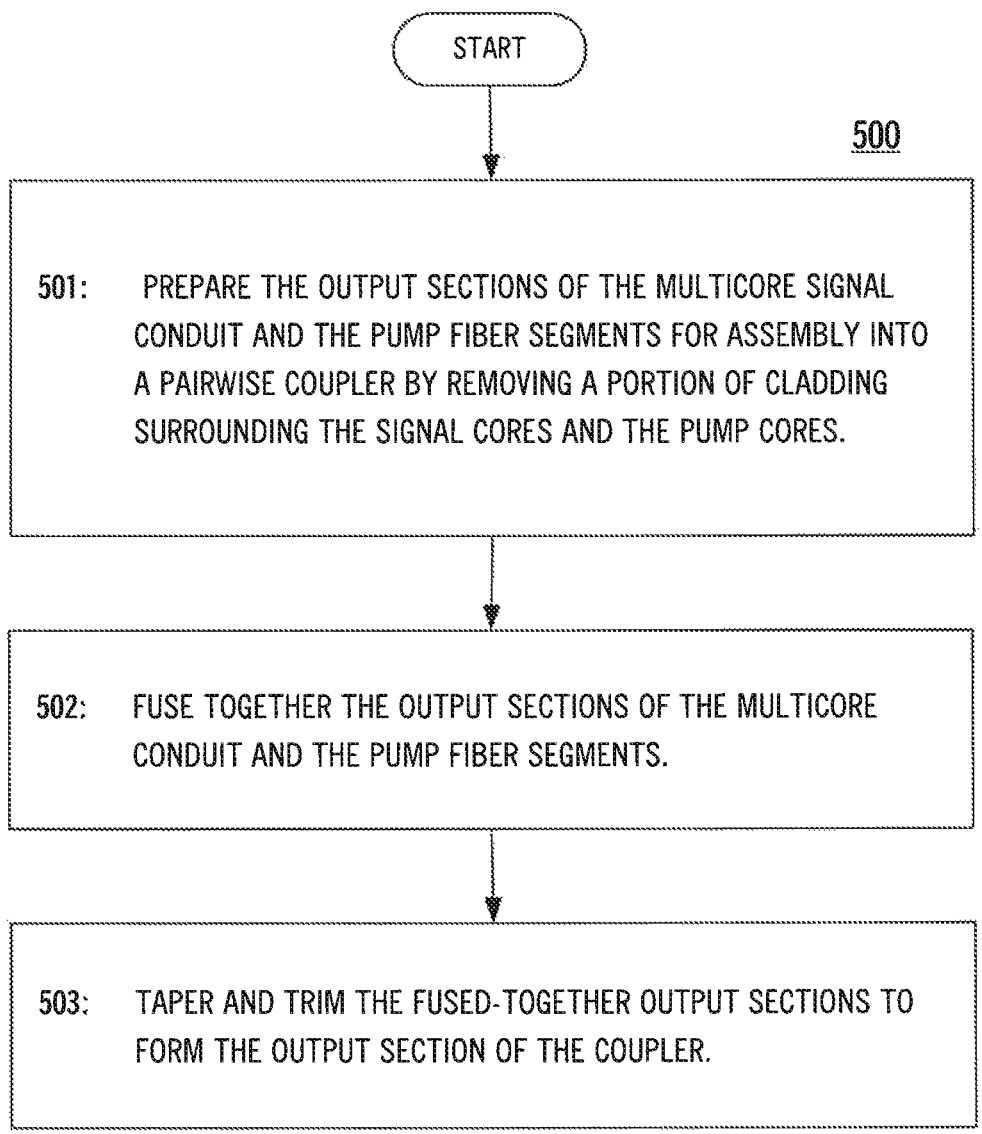
Figure 51:
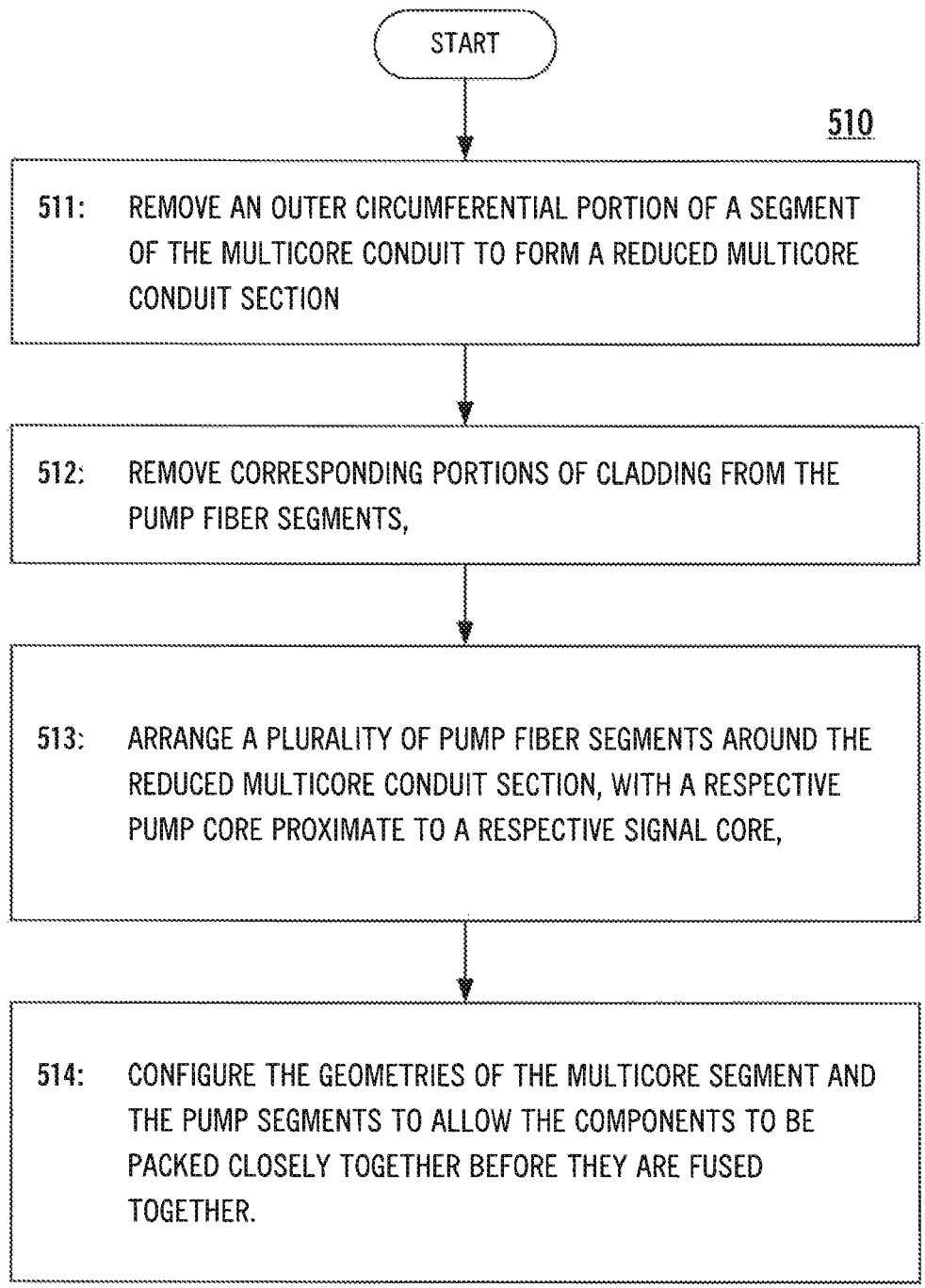

FIGS. 49-51 are a series of flowcharts illustrating exemplary techniques 490, 500, and 510, according to aspects of the invention for connecting a transmission multicore optical fiber (TMCF) with an amplifier multicore optical fiber (AMCF) and a plurality of optical pump fibers.

It should be noted that FIGS. 48-50 are intended to be exemplary, rather than limiting. The present invention may be practiced in a number of different ways, using different combinations of some or all of the elements set forth in these drawings, as well as combinations including elements not explicitly set forth, in these drawings. Further, the enumerated steps may be performed in a different order, or contemporaneously.

First Exemplary Technique

First exemplary technique 490, illustrated in FIG. 49, comprises the following steps:

491: Provide a multicore conduit comprising a plurality of signal cores extending between, a multicore input endface and a coupler output endface.

492: Configure the multicore input endface to be connectable to a TMCF such that each signal core carries signal light at a signal wavelength from a respective TMCF core.

493: Provide a plurality of pump fiber segments comprising a plurality of pump cores, each pump core extending between a pump input and the coupler output endface.

494: Configure each pump input to be connectable to a pump input fiber such that each pump core carries pump light at a pump wavelength from a respective pump input fiber, wherein, the pump wavelength is different from the signal wavelength.

495: Pair each pump core with a corresponding signal core to form a core pair that is adiabatically tapered along an adiabatically tapered coupler section, such that signal light carried by the signal core is combined with pump light carried by the pump core along the adiabatically tapered section.

496: Configure the coupler output endface to be connectable to the AMCF such that the combined light output of each core pair is provided as an input to a respective AMCF core.

Second Exemplary Technique

FIG. 50 is a flowchart setting forth an exemplary technique for fabricating a pairwise coupler, comprising the following steps:

501: Prepare the output sections of the multicore signal conduit and the pump fiber segments for assembly into a pairwise coupler by removing a portion of cladding surrounding the signal cores and the pump cores.

502: Fuse together the output sections of the multicore conduit and the pump fiber segments.

503: Taper and trim the fused-together output sections to form the output section of the coupler.

Second Exemplary Technique

FIG. 51 is a flowchart setting forth an exemplary technique 510 for removing a portion of the cladding surrounding the output section of the multicore conduit and pump fiber segments in a pairwise coupler, comprising the following steps:

511: removing an outer circumferential portion of a segment of the multicore conduit to form a reduced multicore conduit section 512: removing corresponding portions of cladding from the pump fiber segments, 513: arranging a plurality of pump fiber segments around the reduced multicore conduit section, with a respective pump core proximate to a respective signal core, 514: Configure the geometries of the multicore segment and the pump segments to allow the components to be packed closely together before they are fused together.

CONCLUSION

While the foregoing description includes details which will enable those skilled in the art to practice the Invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. An optical fiber coupler for connecting a transmission multicore optical fiber (TMCF) with an amplifier multicore optical fiber (AMCF) and a plurality of optical pump fibers, the coupler comprising:
a plurality of signal cores extending between a multicore input endface and a coupler output endface, wherein the multicore input endface is configured to be connectable to the TMCF such that each signal core carries signal light at a signal wavelength from a respective TMCF core; and
a plurality of pump cores, each extending between a pump input and the coupler output endface, wherein each pump input is configured to be connectable to a pump input fiber such that each pump core carries pump light at a pump wavelength from a respective pump input fiber, wherein the pump wavelength is different from the signal wavelength,
wherein each pump core is paired with a corresponding signal core to form a core pair that is adiabatically tapered along an adiabatically tapered coupler section, such that signal light carried by the signal core is combined with pump light carried by the pump core along the adiabatically tapered section, and
wherein the coupler output endface is configured to be connectable to the AMCF such that the combined light output of each core pair is provided as an input to a respective AMCF core.

2. The coupler of claim 1, wherein the adiabatically tapered section couples light at either the signal wavelength or the pump wavelength, but not both.

3. The coupler of claim 2, wherein the pump cores and signal cores are configured to suppress coupling at the signal wavelength, such that pump light is coupled in a pump-to-signal (P-to-S) direction but signal light is not coupled in a signal-to-pump (S-to-P) direction, whereby pump light and signal light are combined in the signal core of a core pair.

4. The coupler of claim 3, wherein, the pump core in a core pair is configured to have a fundamental cutoff wavelength that is equal to or greater than the signal wavelength.

5. The coupler of claim 2, wherein the pump cores and signal cores are configured to suppress coupling at the pump wavelength, such that signal light is coupled in a signal-to-pump (S-to-P) direction but pump light is not coupled in a pump-to-signal (P-to-S) direction, whereby pump light and signal light are combined in the pump core of a core pair.

6. The coupler of claim 5, wherein one-way coupling in the S-to-P direction is accomplished by configuring the adiabatic tapered section of the multicore signal conduit such that each respective signal core tapers from a selected radius $R_{big}$ to a selected radius $R_{small}$, thereby causing a gradual, wavelength-dependent change in effective refractive index along the core, and wherein the tapered section and respective pump and signal cores are configured such that the index-matching point for the signal wavelength occurs along the tapered section, but no index-matching point for the pump wavelength occurs along the tapered section.

7. The coupler of claim 6, wherein in a region of the tapered section corresponding to the index-matching point, the taper changes slowly, so that coupling is adiabatic or as close to adiabatic as possible.

8. The coupler of claim 7,
wherein the tapered coupler section has a core radius r that changes as a function of axial position z over the length of the tapered coupler section $L_{taper}$,
wherein the tapered coupler section induces a periodic split $\Delta n$ in effective refractive index between otherwise index-matched modes, and
wherein the adiabatic condition comprises:

$$\frac{dr}{dz} \ll \frac{r}{L_{beat}}$$

and $$L_{taper} \gg L_{beat}$$

where $$\frac{dr}{dz}$$

is the rate of change of core radius r as a function of axial position z, and where beat length $L_{beat}$ is the period of the split in effective refractive index induced by the tapered coupler section.

9. The coupler of claim 8, wherein $L_{beat}$ is estimated based upon the relationship:

$$L_{beat} \approx \frac{\lambda}{\Delta n},$$

whereby $$\frac{r}{L_{beat}} \approx \frac{r\Delta n}{\lambda},$$

whereby the adiabatic condition comprises $$\frac{dr}{dz} \ll \frac{r\Delta n}{\lambda}$$

and $$L_{taper} \gg \frac{\lambda}{\Delta n}.$$

10. The coupler of claim 8, wherein $L_{beat}$ is estimated based upon the relationship:

$$L_{beat} \approx \frac{\lambda}{c_0},$$

where $c_0$ is coupling strength, whereby $$\frac{r}{L_{beat}} \approx \frac{rc_0}{\lambda},$$

and whereby the adiabatic condition comprises $$\frac{dr}{dz} \ll \frac{rc_0}{\lambda}$$

and $$L_{taper} \gg \frac{\lambda}{c_0}.$$

11. The coupler of claim 1, wherein the adiabatic taper is configured to enable a plurality of signal cores and pump cores to be combined in a single taper without requiring individual tuning of each pair.

12. The coupler of claim 1, wherein the adiabatic taper is configured to enable coupling that is sufficiently broadband to accommodate dense wavelength-division multiplexing (DWDM) signals.

13. The coupler of claim 1, wherein crosstalk is reduced by reducing signal coupling between respective signal cores of neighboring core pairs.

14. The coupler of claim 1, wherein the multicore signal conduit of the coupler further comprises a pedestal fiber region configured to maintain a substantially constant mode field diameter (MFD).

15. The coupler of claim 1, wherein the configuration of pump cores and signal cores is scalable with the size of the circumferential outer surface of the multicore signal conduit of the coupler.

16. The coupler of claim 15, wherein the coupler is scalable such that an AMCF having more cores than a corresponding TMCF can be coupled to the TMCF, wherein multiple TMCFs can be combined by a single coupler into a single AMCF.

17. The coupler of claim 15, wherein the AMCF can have a core array with a high aspect ratio or an aspect ratio equal to or close to 1:1.

18. The coupler of claim 1, wherein the pump and signal cores include one or more multimode cores.

19. The coupler of claim 1 wherein at least one the pump inputs comprises a multicore fiber.

20. The coupler of claim 1 wherein:
the TMCF has a plurality of individual cores extending through a shared cladding and each TMCF core carries a respective signal light at a selected signal wavelength;
each pumping light source provides pumping light at a selected pumping wavelength, and each pumping light source is configured as a plurality of individual single-core fibers, each corresponding to a respective TMCF core;
the AMCF comprises a plurality of individual cores extending through a shared cladding, configured to receive, as inputs, signal light and pump light at respective signal and pump wavelengths; and
the coupler is configured to receive signal light from the TMCF and pumping light from the pumping light sources, and to provide to each individual core of the AMCF the signal light from a respective TMCF core combined with pump light from a respective pumping fiber.

21. The coupler of claim 1, further comprising a plurality of individual pump leads connected to individual pump fibers corresponding to respective cores of the TMCF, wherein the coupler is configured such that pump light from each pump fiber is combined with signal light from a respective TMCF core, and the combined signal and pump light is then conducted into a respective core of the AMCF.

22. The coupler of claim 1, wherein the coupler is fabricated by assembling together a segment of TMCF conduit with N signal cores and a set of N single-core pump fibers, with the cores of the pump fibers aligned with respective cores at the outer circumference of the segment of TMCF conduit,
wherein a portion of cladding at the outer circumference of the TMCF conduit segment, and a corresponding portion of the outer cladding of each pump fiber, is removed to enable the respective cores of the TMCF conduit segment and pump fibers to be positioned in close proximity, and
wherein the cores are fused together into a block, and the block is then tapered adiabatically and trimmed to create coupler endfaces having a core configuration matching those of the TMCF and AMCF, respectively.

23. The coupler of claim 22 wherein distal, non-fused ends of the TMCF conduit segment and pump fibers provide connection leads into the coupler.

24. The coupler of claim 1 configured for use with single-core transmission and amplification fibers.

25. A method for connecting a transmission multicore optical fiber (TMCF) with an amplifier multicore optical fiber (AMCF) and a plurality of optical pump fibers, the method comprising:
providing a multicore conduit comprising a plurality of signal cores extending between a multicore input endface and a coupler output endface, wherein the multicore input endface is configured to be connectable to the TMCF such that each signal core carries signal light at a signal wavelength from a respective TMCF core; and providing a plurality of pump fiber segments comprising a plurality of pump cores, each pump core extending between a pump input and the coupler output endface, wherein each pump input is configured to be connectable to a pump input fiber such that each pump core carries pump light at a pump wavelength from a respective pump input fiber, wherein the pump wavelength is different from the signal wavelength, wherein each pump core is paired with a corresponding signal core to form a core pair that is adiabatically tapered along an adiabatically tapered coupler section, such that signal light carried by the signal core is combined with pump light carried by the pump core along the adiabatically tapered section, and wherein the coupler output endface is configured to be connectable to the AMCF such that the combined light output of each core pair is provided as an input to a respective AMCF core.

26. The method of claim coupler of claim 25, including:

preparing the output sections of the multicore signal conduit and the pump fiber segments for assembly into a pairwise coupler by removing a portion of cladding surrounding the signal cores and the pump cores;

fusing together respective the output sections of the multicore conduit and the pump fiber segments;

tapering and trimming the fused-together output sections to form the output section of the coupler.

27. The coupler of claim 26, wherein the step of removing a portion of the cladding surrounding the signal cores and the pump cores includes removing an outer circumferential portion of a segment of the multicore conduit to form a reduced multicore conduit section and removing corresponding portions of cladding from the pump fiber segments, and wherein a plurality of pump fiber segments are arranged around the reduced multicore conduit section, with a respective pump core proximate to a respective signal core, wherein the geometries of the multicore segment and the pump segments are configured to allow the components to be packed closely together before they are fused together.

* * * * *